United States Patent
Torvi et al.

(10) Patent No.: US 11,070,463 B2
(45) Date of Patent: Jul. 20, 2021

(54) GUARANTEED BANDWIDTH FOR SEGMENT ROUTED (SR) PATHS

(71) Applicant: Juniper Networks, Inc., Sunnyvale, CA (US)

(72) Inventors: Raveendra Torvi, Nashua, NH (US); Sudharsana Venkataraman, Toronto (CA); Tarek Saad, Ottawa (CA); Vishnu Pavan Beeram, Naperville, IL (US)

(73) Assignee: Juniper Networks, Inc., Sunnyvale, CA (US)

( * ) Notice: Subject to any disclaimer, the term of this patent is extended or adjusted under 35 U.S.C. 154(b) by 108 days.

(21) Appl. No.: 16/589,115

(22) Filed: Sep. 30, 2019

(65) Prior Publication Data

US 2021/0029021 A1 Jan. 28, 2021

Related U.S. Application Data

(60) Provisional application No. 62/877,845, filed on Jul. 24, 2019.

(51) Int. Cl.
*H04L 12/729* (2013.01)
*G06F 16/23* (2019.01)
(Continued)

(52) U.S. Cl.
CPC ........ *H04L 45/125* (2013.01); *G06F 16/2379* (2019.01); *H04L 45/02* (2013.01); *H04L 45/24* (2013.01)

(58) Field of Classification Search
CPC combination set(s) only.
See application file for complete search history.

(56) References Cited

U.S. PATENT DOCUMENTS

2009/0285101 A1* 11/2009 Lu .................. H04L 45/122
370/238
2018/0109439 A1* 4/2018 Chen ............... H04L 45/124
(Continued)

FOREIGN PATENT DOCUMENTS

EP 3 402 140 A1 11/2018

OTHER PUBLICATIONS

Extended European Search Report to corresponding European Patent Application No. 19219066.8-1215, dated May 26, 2020 (9 pgs.).

*Primary Examiner* — Xavier S Wong
(74) *Attorney, Agent, or Firm* — John C. Pokotylo; Pokotylo Patent Services

(57) ABSTRACT

At least one bandwidth-guaranteed segment routing (SR) path through a network is determined by: (a) receiving, as input, a bandwidth demand value; (b) obtaining network information; (c) determining a constrained shortest multipath ($CSG_i$); (d) determining a set of SR segment-list(s) ($S_i=[sl_1^i, sl_2^i \ldots sl_n^i]$) a that are needed to steer traffic over $CSG_i$; and (e) tuning the loadshares in $L_i$, using $S_i$ and the per segment-list loadshare ($L_i=[l_1^i, l_2^i \ldots l_n^i]$), the per segment equal cost multipath ("ECMP"), and the per link residual capacity, such that the bandwidth capacity that can be carried over $CSG_i$ is maximized.

17 Claims, 21 Drawing Sheets

(51) Int. Cl.
*H04L 12/751* (2013.01)
*H04L 12/707* (2013.01)

(56) References Cited

U.S. PATENT DOCUMENTS

2018/0343189 A1   11/2018  Hao et al.
2018/0343193 A1*  11/2018  Hao ........................ H04L 45/20
2020/0351193 A1*  11/2020  Mao ...................... H04L 43/087

* cited by examiner

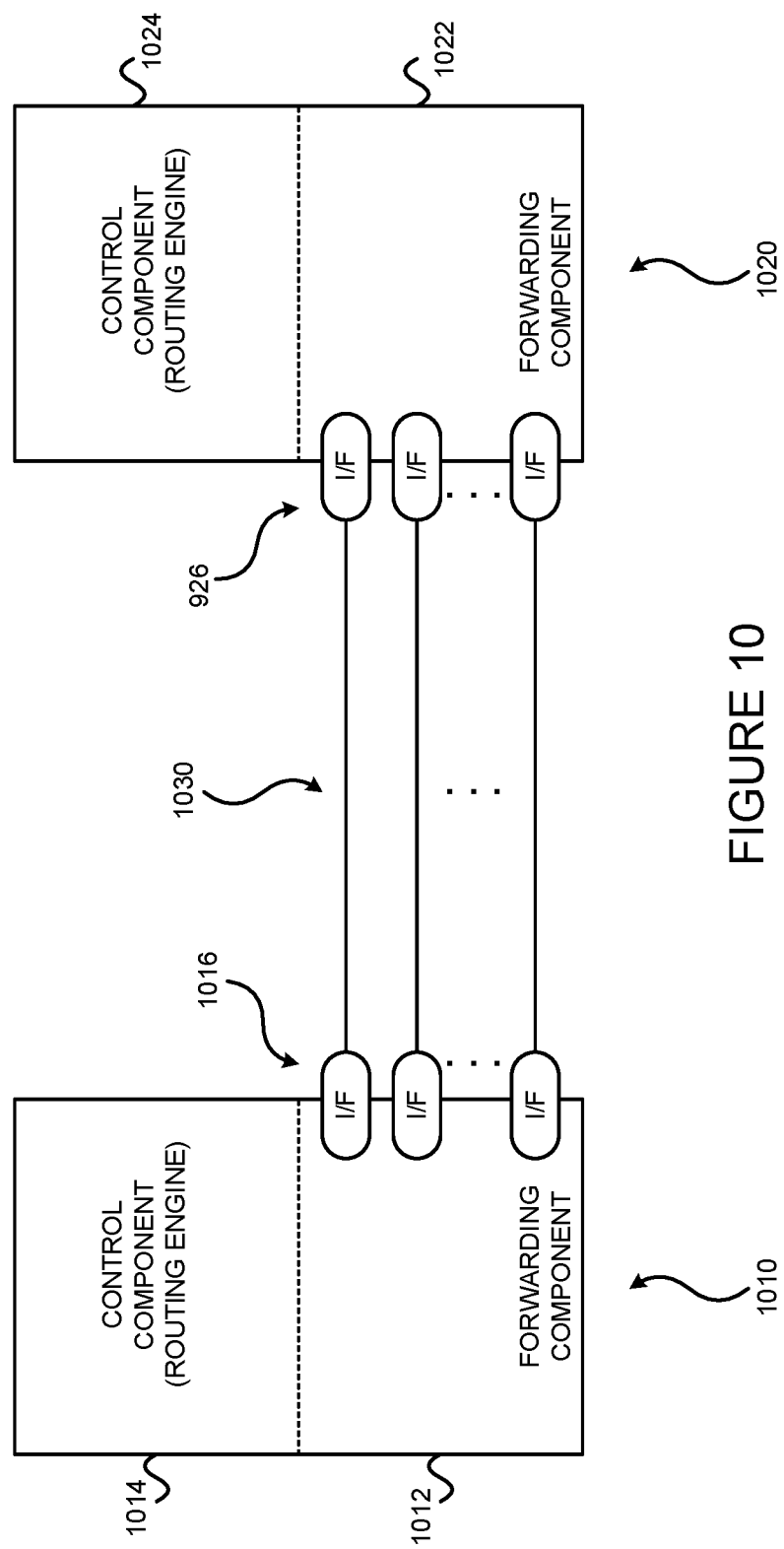

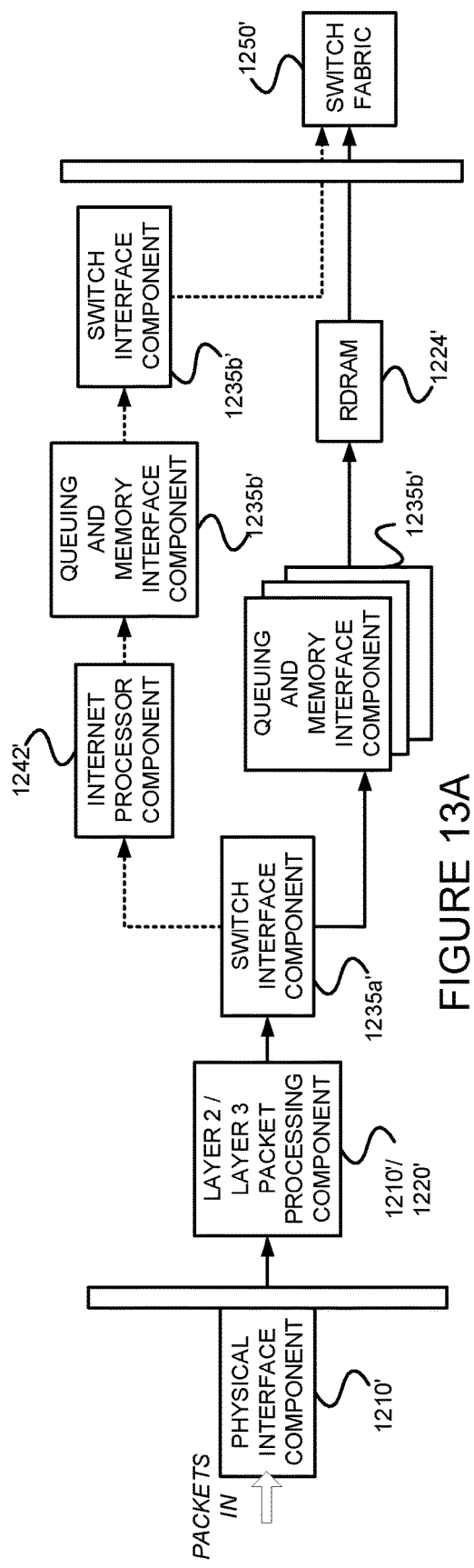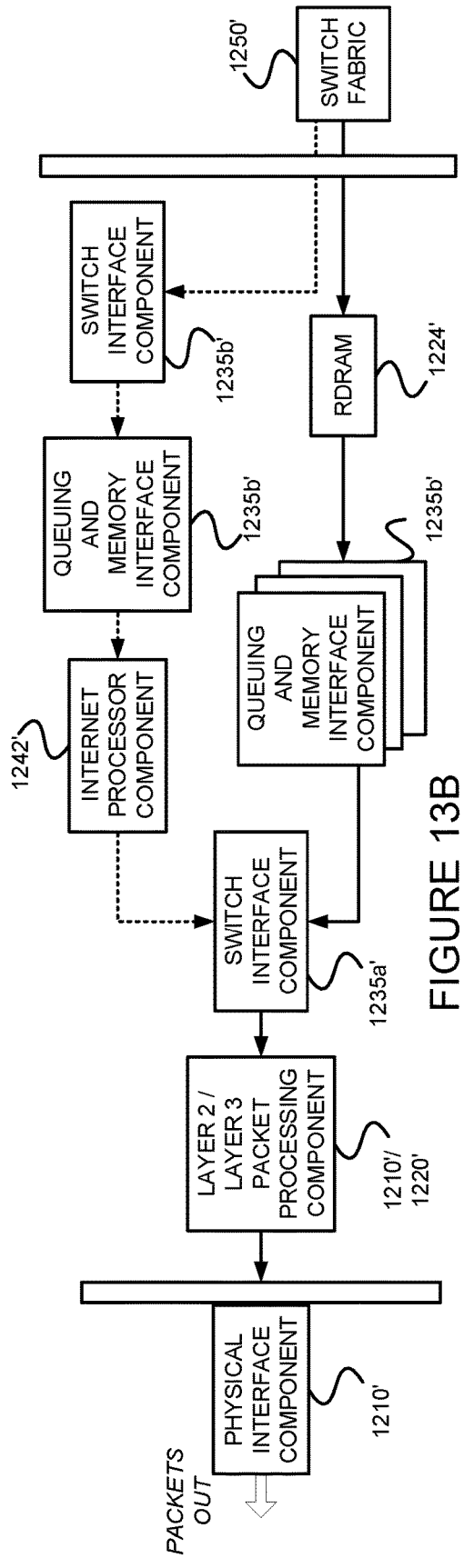

```
Stack
cspf_sr_stack (Root R, Destination D, Stack S)                1710
{
    Stack S_best, S_current If SG(R,D) == CSG(R,D) {
        /* Feasible node-SID from R */      1720
        S += node-SID(D)
        /* Done! */                  1770
        return
    }                        1790

FOR_ALL_PATHS(CSG(R,D), p_i) {
        /* Walk backwards from the destination */
        X := D                                              1760      1730
        while ((X = upstream(p_i, X)) != R) {
            if SMP(R, X) == CSMP(R, X) {
                /* Found a feasible node-SID hop from R */   1720
                S_current += node-SID(X)
                /* Find remaining stack from X to D */        1770
                R := X
                S_current += cspf_sr_stack(X, D, S_current)   1760
            }
        }
        if (upstream(p_i, D) == R) {                 1740
            /* only adjacency-SID possible */   1750
            S_current += adjacency-SID(R,X)
            return
        }
        if (S_best == 0) S_best = S_current
        if (S_best > S_current) S_best = S_current
    }
}
```

FIGURE 16

GUARANTEED BANDWIDTH FOR SEGMENT ROUTED (SR) PATHS

§ 0. RELATED APPLICATION(S)

This application claims the benefit of U.S. Provisional Application No. 62/877,845 (referred to as "the '845 provisional" and incorporated herein by reference), titled "GUARANTEED BANDWIDTH FOR SEGMENT ROUTED (SR) PATHS," filed on Jul. 24, 2019 and listing Raveendra Torvi, Abhishek Deshmukh, Tarek Saad and Vishnu Pavan Beeram as the inventors. The scope of the invention is not limited to any requirements of the specific embodiments in the '845 provisional.

§ 1. BACKGROUND OF THE INVENTION

§ 1.1 Field of the Invention

The present description concerns communications networks. More specifically, the present invention concerns path computation and bandwidth allocation in a communications network employing segment routing.

§ 1.2 Background Information

§ 1.2.1 Segment Routing

The Internet was initially designed to provide best-effort connectivity over a least-cost path. In today's Internet, however, many applications require more than best-effort connectivity over a least-cost path. Today, network operators are tasked with delivering advance services such as traffic engineering and fast reroute at scale. To deliver these advanced services at scale, network operators must reduce network complexity. Segment Routing (SR) offers an innovative approach to traffic steering. It can be applied to long-standing problems such as traffic engineering and fast reroute. When applied to these problems, SR can simplify routing protocols, network design and network operations.

Segment routing (also referred to as Source Packet Routing in Networking ("SPRING")) is a control-plane architecture that enables an ingress router to steer a packet through a specific set of nodes and links in the network without relying on the intermediate nodes in the network to determine the actual path it should take. In this context, the term "source" means the point at which the explicit route is imposed. Segment routing is defined in "Segment Routing Architecture," Request for Comments 8402 (July 2018, the Internet Engineering Task Force) (referred to as "RFC 8402" and incorporated herein by reference). SPRING enables automation of a network by using a software-defined network ("SDN") controller for traffic steering and traffic engineering in a wide area network ("WAN") packet network.

Segment routing leverages the source routing paradigm. A node steers a packet through an ordered list of instructions, called "segments." For example, an ingress router (also referred to as "a headend router") can steer a packet through a desired set of nodes and links by prepending the packet with segments that contain an appropriate combination of tunnels.

§ 1.2.1.1 SR Domain

An SR domain is a collection of nodes that participate in SR protocols. Within an SR domain, a node can execute ingress, transit, or egress procedures. FIG. 1 depicts a network in which a source node sends a packet to a destination node. The source and destination nodes reside outside of the SR domain, but the path between them traverses the SR domain. More specifically, when the packet arrives at the SR ingress node (R1), the ingress node subjects the packet to policy. Policy can associate a packet with an SR path. Policy includes match conditions and actions. If the packet satisfies match conditions, the SR ingress node (R1) can encapsulate the packet in an SR tunnel. The SR tunnel traverses an SR path to the egress node (R6).

The SR path can be engineered to satisfy any number of constraints (e.g., minimum link bandwidth, maximum path latency). While an SR path can follow the least cost path to the egress node, constraints can cause it to follow another path.

The source node and the SR ingress node may reside on independent hardware platforms (e.g., on a laptop and a router, respectively), or the source node and SR ingress node can reside on the same hardware (e.g., on a virtual machine and a hypervisor, respectively). Similarly, the SR egress node and the destination node can reside on independent hardware platforms, or on a single platform. In a less typical configuration, the source node resides within the SR domain. In this case, the source node is also the SR ingress node, because it executes SR ingress procedures Similarly, the destination node can reside within the SR domain, in which case, the destination node is also the SR egress node, because it executes SR egress procedures.

§ 1.2.1.2 SR Path

An SR path is an ordered list of segments that connects an SR ingress node to an SR egress node. While an SR path can follow the least cost path from ingress to egress, it can also follow another path.

Different SR paths can share the same segment. For example, referring to FIG. 2, Path A connects ingress node A to egress node Z, while Path B connects ingress node B to the same egress node Z. Both paths A and B traverse Segment 3.

When an SR ingress node encapsulates a packet in an SR tunnel, it encodes the associated segment list in the tunnel header. It then forwards the packet downstream. Transit nodes process the tunnel header, forwarding the packet from the current segment to the next segment. Since the SR ingress node encodes path information in the tunnel header, transit nodes do not need to maintain information regarding each path that they support. Rather, the transit nodes are only required to process the tunnel header, forwarding the packet from the current segment to the next segment. This is the major benefit of SR. More specifically, since transit nodes are not required to maintain path information, overhead associated with maintaining that information is eliminated, routing protocols are simplified, scaling characteristics are improved, and network operations become less problematic.

§ 1.2.1.3 SR Segments and Segment Types

An SR segment is an instruction that causes a packet to traverse a section of the network topology. While a segment (i.e., an instruction) causes a packet to traverse a section of the network topology, it is distinct from that section of the network topology. SR defines many SR segment types. Among these are the "adjacency segments" and "prefix segments." Each of these types of segments is described below.

§ 1.2.1.3.1 Adjacency Segments

An adjacency segment is an instruction that causes a packet to traverse a specified link (i.e., a link that is associated with an IGP adjacency). FIG. 3 depicts an SR path that connects R1 to R6. The path contains the following adjacency segments: (1) segment 1, instantiated on R1, causes packets to traverse link R1→R2; (2) segment 2, instantiated on R2, causes packets to traverse link R2→R3; and segment 3, instantiated on R3, causes packets to traverse link R3→R6. If any of the above-mentioned links becomes unavailable, so does the associated adjacency segment. Consequently, if any of the above-mentioned adjacency segments becomes unavailable, so does the entire path.

Thus, an adjacency segment is a strict forwarded single-hop tunnel that carries packets over a specific link between two nodes, irrespective of the link cost.

§ 1.2.1.3.2 Prefix Segments

A prefix segment is an instruction that causes a packet to traverse the least cost path to a node or prefix. Referring to FIG. 4A, assume that all links are configured with the same interior gateway protocol (IGP) metric and that the SR path is to be a least cost (and therefore) shortest path. An SR path connects R1 to R6 and contains the following prefix segments: (1) segment 1, instantiated on R1, causes packets to traverse the least cost path from R1 to R2; (2) segment 2, instantiated on R2 and R3, causes packets to traverse the least cost path from the instantiating node to R6. Consequently, when the links are all available, the SR path guides packets through the above-mentioned links and segments.

Referring to FIG. 3, assume that the link R1→R2 becomes unavailable. When this occurs, the network establishes a new least cost path between R1 and R2. This new least cost path includes Links R1→R4, and R4→R2. Since the network has established a new least cost path between R1 and R2, segment 1 remains available and causes packets to traverse the new least cost path. The behavior of segment 2 is unchanged. Therefore, the path now traverses Links R1→R4, R4→R2, R2→R3 and R3→R6.

Thus, a prefix segment is a multihop tunnel that uses equal cost multi-hop aware shortest path links to reach a prefix. A prefix segment identifier (SID) supports both IPv4 and IPv6 prefixes. A node segment is a special case of prefix segment that uses shortest path links between two specific nodes.

§ 1.2.1.3.3 Anycast Segments

An IGP anycast segment is an IGP prefix segment that identifies a set of routers. An anycast segment enforces forwarding based on the equal-cost multipath-aware shortest-path toward the closest node of the anycast set. Within an anycast group, all the routers advertise the same prefix with the same segment identifier (SID) value, which facilitates load balancing. Thus, an anycast segment is also a type of prefix segment that identifies a set of routers to advertise the same prefix with the same SID value.

§ 1.2.1.4 SR MPLS

In SR-MPLS, SR paths are encoded as MPLS label stacks, with each label stack entry representing a segment in the SR path. The following describes how MPLS labels are used to encode adjacency and prefix segments.

§ 1.2.1.4.1 Using MPLS Labels to Encode Adjacency Segments

Referring to FIG. 5, an SR path connects R1 to R4. The SR path contains three adjacency segments. Segment 1 causes packets to traverse link R1→R2, while segment 2 causes packets to traverse link R2→R3, and segment 3 causes packets to traverse link R3→R4. When R1 receives a packet from outside of the SR domain, it subjects the packet to policy. Policy may cause R1 to forward the packet through the SR path shown in FIG. 5. When this occurs, R1 imposes an MPLS label stack containing two entries. The entry at the top of the stack represents segment 2 and carries MPLS label 1002. The entry at the bottom of the stack represents segment 3 and carries MPLS label 1003.

Having imposed an MPLS label stack, R1 forwards the packet through segment 1 (i.e., Link R1→R2). When the packet arrives at R2, R2 extracts the top label (i.e., 1002) from the label stack and searches for a corresponding entry in its Forwarding Information Base ("FIB"). The corresponding FIB entry includes an instruction (i.e., POP) and a next-hop (i.e., R3). Therefore, R2 pops the topmost label from the label stack and forwards the packet through segment 2 (i.e., Link R2→R3).

When the packet arrives at R3, R3 extracts the label (i.e., 1003) from the remaining label stack and searches for a corresponding entry in its FIB. The corresponding FIB entry includes an instruction (i.e., POP) and a next-hop (i.e., R4). Therefore, R3 pops the remaining entry from the label stack and forwards the packet through segment 3 (i.e., Link R3→R4). As shown in FIG. 5, the packet arrives at R4 without MPLS encapsulation.

§ 1.2.1.4.2 Using MPLS Labels to Enclode Prefix Segments

In FIG. 6, an SR path connects R1 to R7 via R4. The SR path contains two prefix segments. Segment 1 is a prefix segment that causes packets to traverse the least cost path from R1 to R4. Segment 2 is a prefix segment that causes packets to traverse the least cost path from R4 to R7. In this network, assume that all links are configured with the same IGP metric (e.g., 10). Therefore, the least cost path for the first segment from R1 to R4 traverses links R1→R2, R2→R3 and R3→R4, while the least cost path for the second segment from R4 to R7 traverses links R4→R8 and R8→R7.

When R1 receives a packet from outside of the SR domain, it subjects the packet to policy. Policy may cause R1 to forward the packet through the SR path shown in FIG. 6. When this occurs, R1 imposes an MPLS label stack containing two entries. The top entry of the label stack represents segment 1 and carries the label 2001. The bottom entry of the label stack represents segment 2 and carries the label 2002. Having imposed an MPLS label stack, R1 forwards the packet into segment 1 via link R1→R2.

When the packet arrives at R2, R2 extracts the top label (i.e., 2001) from the label stack and searches for a corresponding entry in its FIB. The corresponding FIB entry includes an instruction (i.e., SWAP-3001) and a next-hop (i.e., R3). Therefore, R2 overwrites the topmost label with a new value (i.e., 3001) and forwards the packet to R3.

When the packet arrives at R3, R3 extracts the top label (i.e., 3001) from the label stack and searches for a corresponding entry in its FIB. The corresponding FIB entry includes an instruction (i.e., POP) and a next-hop (i.e., R4).

Therefore, R3 pops the topmost entry from the label stack and forwards the packet into segment 2 via link R3→R4.

When the packet arrives at R4, R4 extracts the remaining label (i.e., 2002) from the label stack and searches for a corresponding entry in its FIB. The corresponding FIB entry includes an instruction (i.e., SWAP-3002) and a next-hop (i.e., R8). Therefore, R4 overwrites the remaining label with a new value (i.e., 3002) and forwards the packet to R8.

When the packet arrives at R8, R8 extracts the remaining label (i.e., 3002) from the label stack and searches for a corresponding entry in its FIB. The corresponding FIB entry includes an instruction (i.e., POP) and a next-hop (i.e., R7). Therefore, R8 pops the remaining entry from the label stack and forwards the packet to R7 without MPLS encapsulation.

§ 1.2.1.4.3 Penultimate Hop Popping (PHP) And the Explicit Null Label

In the examples above, each segment executes PHP procedures. That is, when a packet traverses a segment, the segment's penultimate node pops the label associated with the segment. If the SR path contains another segment, yet to be traversed, the current segment's egress node is also the ingress node of the next segment. In this case, the packet arrives at that node with the next segment's label exposed on the top of the stack. If the SR path does not contain another segment, yet to be traversed, the segment egress node is also the path egress node. In that case, the packet arrives at the path egress node without MPLS encapsulation.

In some cases, the final link in the SR path may not be able to carry the packet without MPLS encapsulation. For example, the packet may be IPv6, while the link supports IPv4 only. In order to prevent this problem, the SR ingress node can add an MPLS Explicit Null label to the top of the MPLS label stack.

When the penultimate node in the final segment pops the label associated with the final segment, it exposes the Explicit Null label. It then forwards the packet to the path egress node. The path egress node pops the Explicit Null label and continues to process the packet.

§ 1.2.1.5 Configuraiton and Distribution of Segment Identifiers (SIDs)

The foregoing examples described with respect to FIGS. 5 and 6 assumed that MPLS labels were distributed and each node's FIB populated. Essentially segment routing engages interior gateway protocols ("IGPs") like Intermediate-System ("IS-IS") and open shortest path first ("OSPF") for advertising two types of network segments or tunnels—(1) a strict forwarded single-hop tunnel that carries packets over a specific link between two nodes, irrespective of the link cost (referred to as "adjacency segments," which were described in § 1.2.1.3.1 above), and (2) a multihop tunnel using shortest path links between two specific nodes (referred to as "node segments," which were described in § 1.2.1.3.2 above).

Each segment is associated with an identifier, which is referred to as the segment identifier ("SID"). As already noted above, an ordered list of segments is encoded as a stack of labels. A segment can represent any instruction, topological or service-based. A segment can have a local semantic to a segment routing node or to a global node within a segment routing domain. Segment routing enforces a flow through any topological path and service chain while maintaining per-flow state only at the ingress node to the segment routing domain. Segment routing can be directly applied to the multi-protocol label switching ("MPLS") architecture with no change on the forwarding plane. A segment is encoded as an MPLS label. An ordered list of segments is encoded as a "stack" of labels or "label stack." The segment to be processed is on the top of the stack (i.e., the outermost label of the label stack). Upon completion of a segment, the related label is "popped" (i.e., removed) from the stack.

Segment routing can be applied to the IPv6 architecture, with a new type of routing extension header. A segment is encoded as an IPv6 address. An ordered list of segments is encoded as an ordered list of IPv6 addresses in the routing extension header. The segment to process is indicated by a pointer in the routing extension header. Upon completion of a segment, the pointer is incremented.

§ 1.2.1.5.1 Configurable Segment Routing Global Block

As already noted above, segment is encoded as an MPLS label. An ordered list of segments is encoded as a stack of labels. Every node in the segment routing domain is allocated labels by the node label manager based on the index range configured for source packet routing. These labels are allocated to the node segment based on the availability of the dynamic label range managed by node label manager. A segment routing global block ("SRGB") is the range of label values used in segment routing. An available SRGB label range can be configured for the IS-IS and OSPF protocols so that the labels are predictable across segment routing domains. Thus, every node in the segment routing domain is allocated labels based on the availability of the dynamic label range, and the SRGB is the range of label values reserved for segment routing. A SID may be provided as an index to be added to an SRGB base value to obtain a label value.

The IS-IS protocol creates adjacency segments per adjacency, level, and address family (one each for IPv4 and IPv6). An MPLS label is allocated for each adjacency segment that gets created. These labels are allocated after the adjacency status of the segment changes to the up state. The OSPF protocol creates adjacency segments per adjacency.

§ 1.2.1.6 Bandwidth Allocation

Service providers want to deploy bandwidth-guaranteed services and therefore would like to be able to provision their networks to deliver bandwidth-guaranteed paths. Traffic engineering is a tool that optimizes the network utilization by appropriately placing network flows across available path(s) in a way to minimize network congestion while providing the requested service guarantees. To employ traffic engineering, an ingress router or an external server (e.g., a path computation element ("PCE")) uses a Traffic Engineering Database (TED), which has been populated using protocols like IGP-TE (See, e.g., "IGP Routing Protocol Extensions for Discovery of Traffic Engineering Node Capabilities," Request for Comments 5073 (Internet Engineering Task Force, December 2007 (referred to as "RFC 5073" and incorporated herein by reference).), or BGP-LS (See, e.g., "BGP-Link State (BGP-LS) Advertisement of IGP Traffic Engineering Performance Metric Extensions," Request for Comments 8571 (Internet Engineering Task Force, March 2019 (referred to as "RFC 8571" and incorporated herein by reference).), etc., to compute the feasible path(s) subject to specific service constraints (e.g., bandwidth, delay, and/or other topological constraints like SRLG, and affinity).

MPLS LSPs are then established over the computed strict paths. Such MPLS LSPs have been established, traditionally, by leveraging solutions like RSVP-TE (See, e.g., "RSVP-TE: Extensions to RSVP for LSP Tunnels," Request for Comments 3209 (Internet Engineering Task Force, December 2001)(referred to as "RFC 3209" and incorporated herein by reference).)

Automatic bandwidth is also used to allow the ingress router to adjust the per LSP requested bandwidth allocation in the network automatically, based on the incoming volume of traffic. This allows LSP path placement to reflect the latest demand requirements and current network state.

As already introduced above, Segment Routing ("SR") is a relatively new technology that allows for a flexible definition of end-to-end paths by expressing the paths as sequences of topological sub-paths, called "segments". The ingress router or an external server (e.g. PCE) encodes computed path(s) in the form of SR segment-list(s). Traffic is then steered from the ingress over the SR Path by imposing the segments of the segment-list in an SR header that gets added on to the data packets before being forwarded. Transit SR node(s) along the path do not maintain any state about SR path and merely process the SR header to perform the respective preprogrammed segment instruction (e.g. pop and forward, or pop/impose and forward). SR is currently gaining popularity amongst network operators.

Unfortunately, however, to date, SR traffic engineering lacks means to compute bandwidth-guaranteed SR Path(s) that consider one or more SR segment(s) that supports multi-path (e.g., Equal Cost MultiPath ("ECMP") (See, e.g., "Multipath Issues in Unicast and Multicast Next-Hop Selection," Request for Comments 2991 (Internet Engineering Task Force, November 2000)(referred to as "RFC 2991" and incorporated herein by reference).), and that maps the per SR Path resource utilization on traversed link(s). More specifically, unlike explicit path(s) that are computed and signaled with RSVP-TE, SR traffic engineered path(s) can utilize SR segments that are multi-path capable (e.g., can load-balance traffic among ECMPs).

Thus, there is a need to provide traffic engineering (e.g., bandwidth computation) that considers traffic splits that could occur due to one or more ECMP(s) of segments to be traversed by data packets.

§ 2. SUMMARY OF THE INVENTION

One or more of the goals set forth above may be accomplished by determining at least one bandwidth-guaranteed segment routing (SR) path through a network by: (a) receiving, as input, a bandwidth demand value; (b) obtaining network information; (c) determining a constrained shortest multipath ($CSG_i$); (d) determining a set of SR segment-list(s) ($S_i=[sl_1^i, sl_2^i \ldots sl_n^i]$) that are needed to steer traffic over $CSG_i$; and (e) tuning the loadshares in $L_i$, using $S_i$ and the per segment-list loadshare ($L_i=[l_1^i, l_2^i \ldots l_n^i]$), the per segment equal cost multipath ("ECMP"), and the per link residual capacity, such that the bandwidth capacity that can be carried over $CSG_i$ is maximized.

In at least some example embodiments consistent with the present description, the CSG is formed of paths of equal cost of minimum accumulative path metric.

In at least some example embodiments consistent with the present description, the CSG is formed of paths of equal cost of minimum accumulative path metric after excluding link(s) due to any topological constraints (e.g. link affinities).

In at least some example embodiments consistent with the present description, the CSG is formed of paths of equal cost of minimum accumulative path metric after pruning out zero residual bandwidth links.

In at least some example embodiments consistent with the present description, the CSG is formed of paths of equal cost of minimum accumulative path metric.

In at least some example embodiments consistent with the present description, the act of obtaining network information is performed by accessing information in a traffic engineering database (TED). In such example embodiments, the computer-implemented method may further comprise: (f) updating the TED or a workspace including information from the TED, to deduct bandwidth capacity used on $CSG_i$. In such example embodiments, the computer-implemented method may further comprise: (g) determining whether or not the (remaining) bandwidth demand can be satisfied by $CSG_i$; and (h) responsive to a determination that the capacity of $CSG_i$ is smaller than the (remaining) demand, repeating the above-described acts of (a) receiving (b) obtaining, (c) determining, (d) determining; and (e) tuning.

In at least some example embodiments consistent with the present description, the act of tuning the loadshares in $L_i$, using $S_i$ and the per segment-list loadshare ($L_i=[l_1^i, l_2^i \ldots l_n^i]$), the per segment equal cost multipath ("ECMP"), and the per link residual capacity, such that the bandwidth capacity that can be carried over CSG is maximized, uses a sequential least squares programming procedure.

§ 3. BRIEF DESCRIPTION OF THE DRAWINGS

FIG. 10 illustrates two data forwarding systems, which may be used as nodes in an SR domain, coupled via communications links.

FIGS. 13A and 13B is an example of operations of the example architecture of FIG. 12.

FIGS. 16 and 17 illustrate pseudo code and a flow diagram, respectively, of an example method for determining a set of SR segments list(s) that are needed to steer traffic over the $i^{th}$ constrained shorted multipath.

§ 4. DETAILED DESCRIPTION

Figure 1:
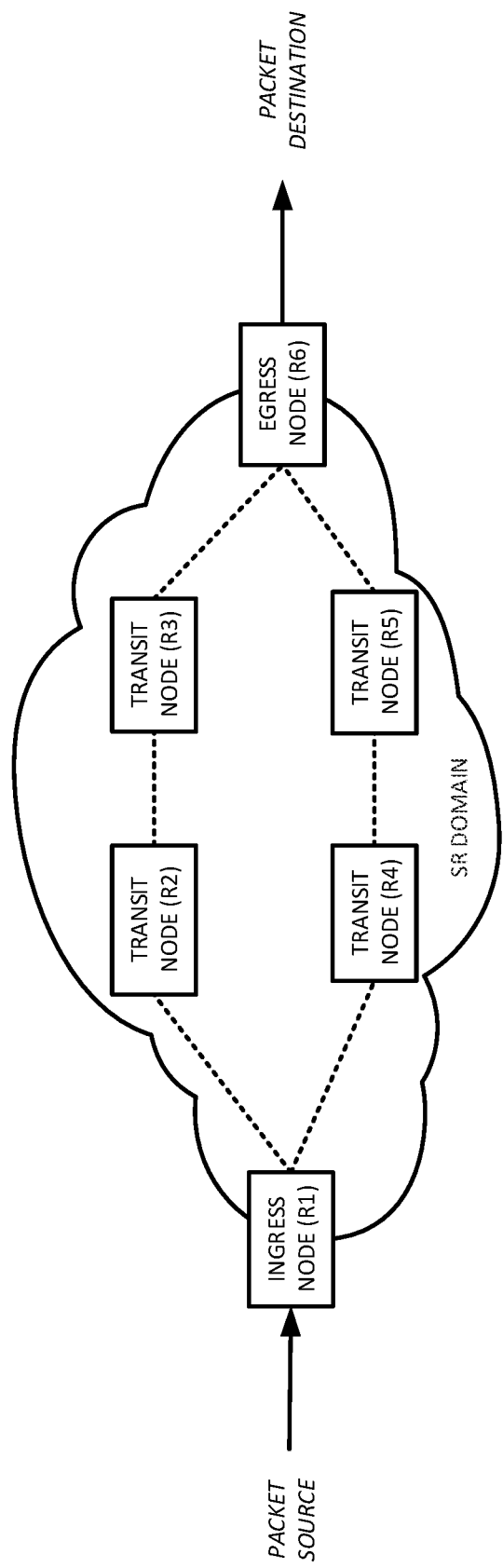
FIG. 1 is an example network used to illustrate an SR domain.
Figure 2:
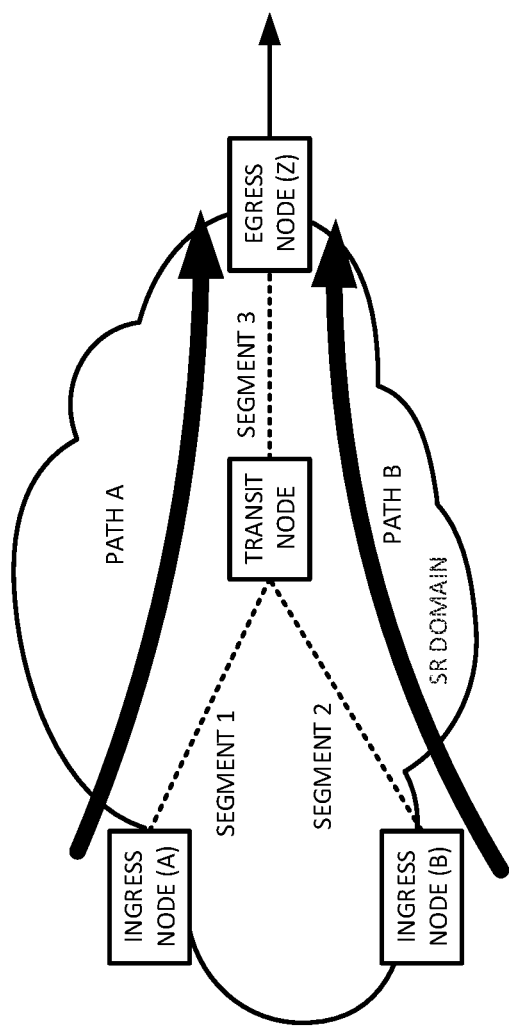
FIG. 2 is an example network used to illustrate SR paths through an SR domain.
Figure 3:
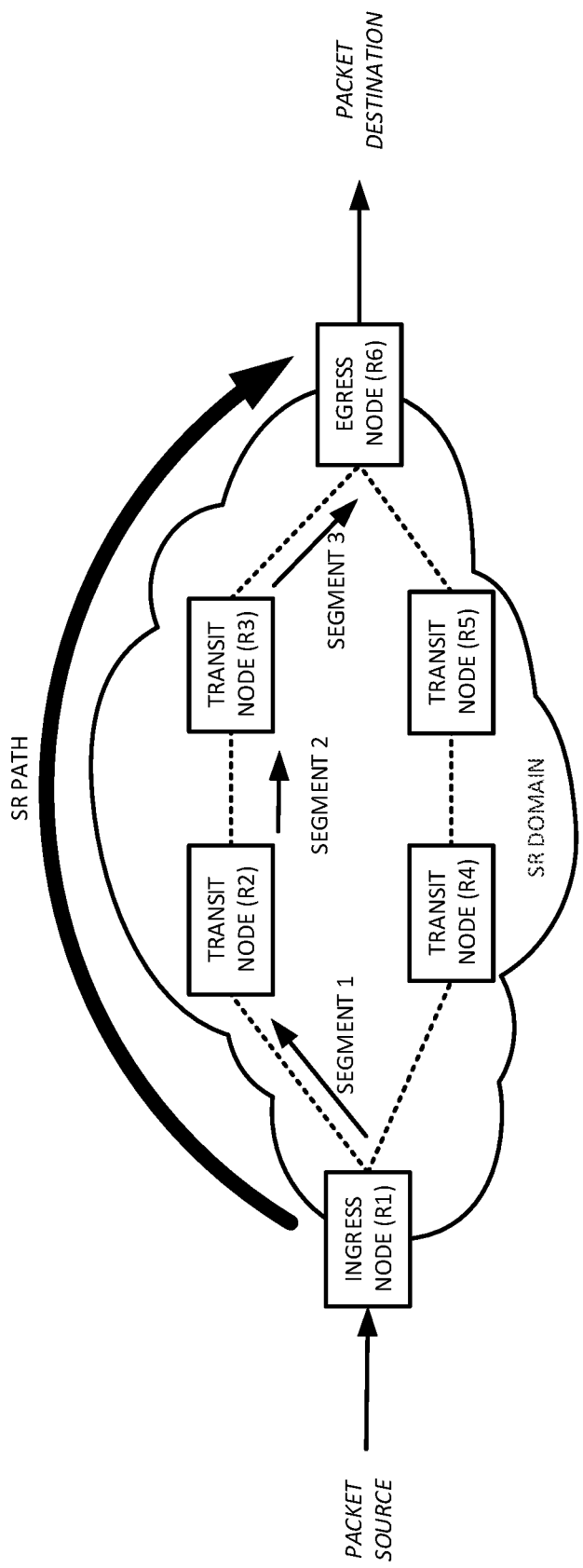
FIG. 3 is an example network used to illustrate adjacency segments in an SR domain.
Figure 4A:
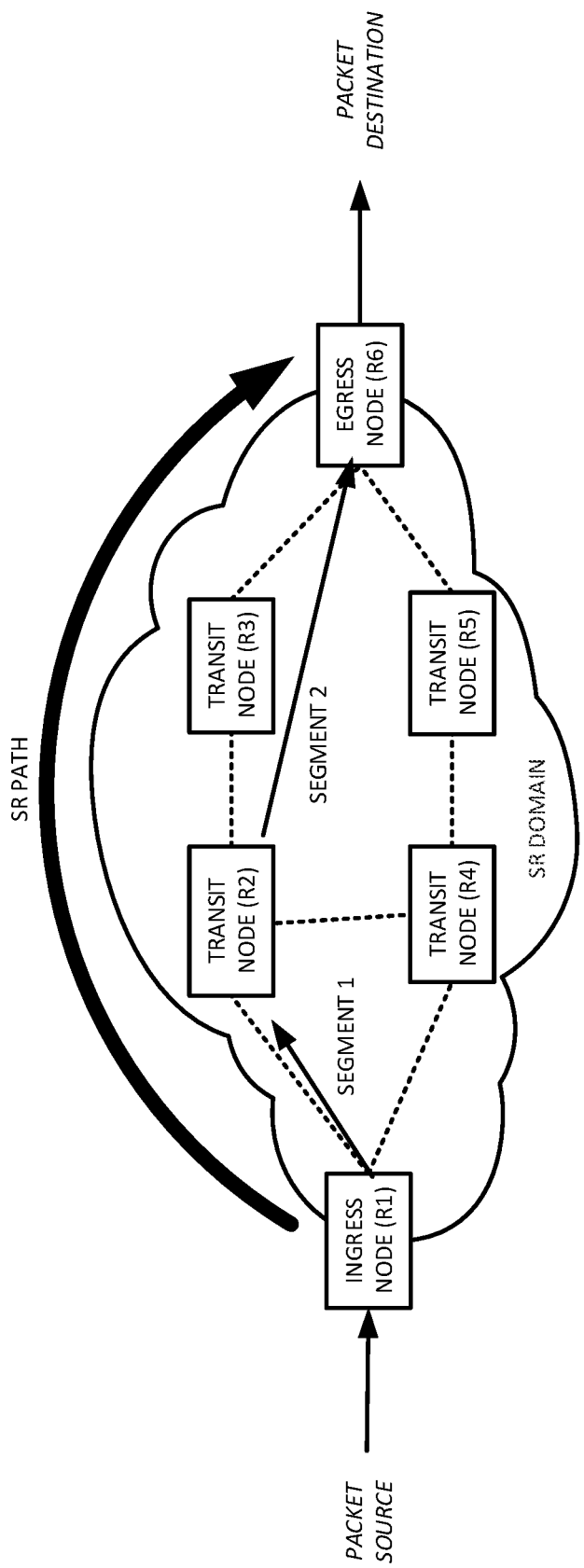
FIGS. 4A and 4B are an example network used to illustrate prefix segments in an SR domain.
Figure 4B:
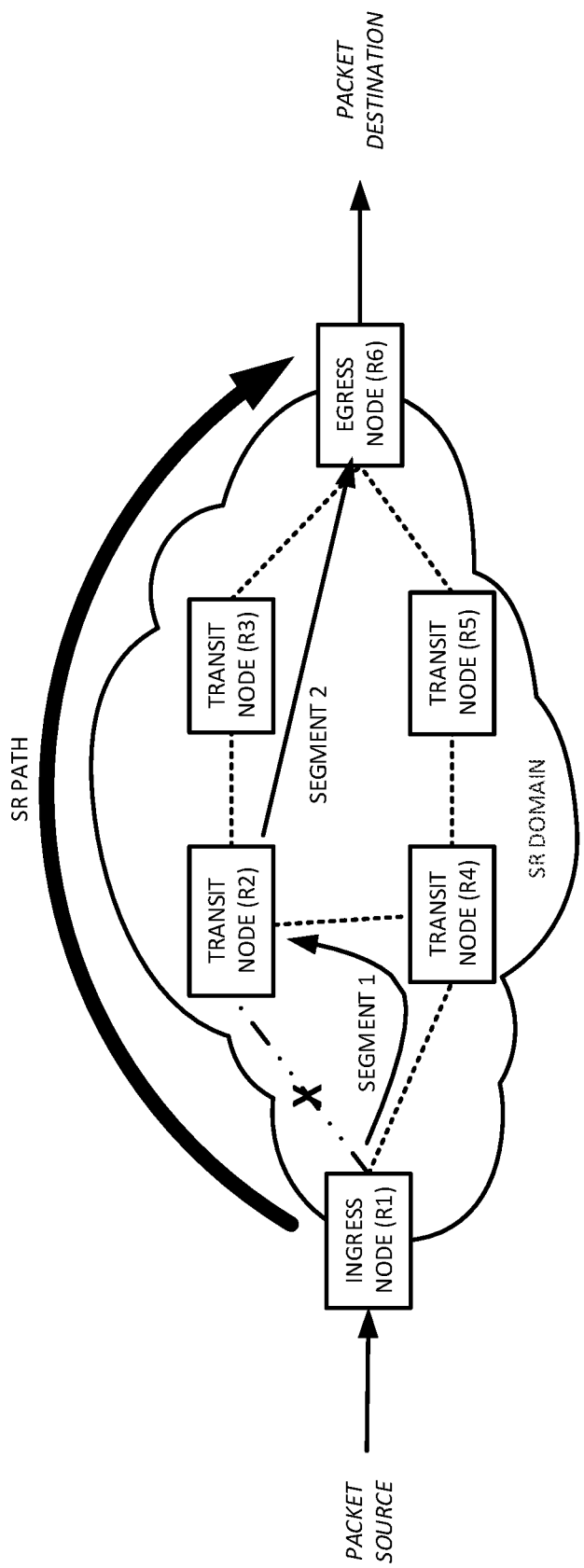
Figure 5:
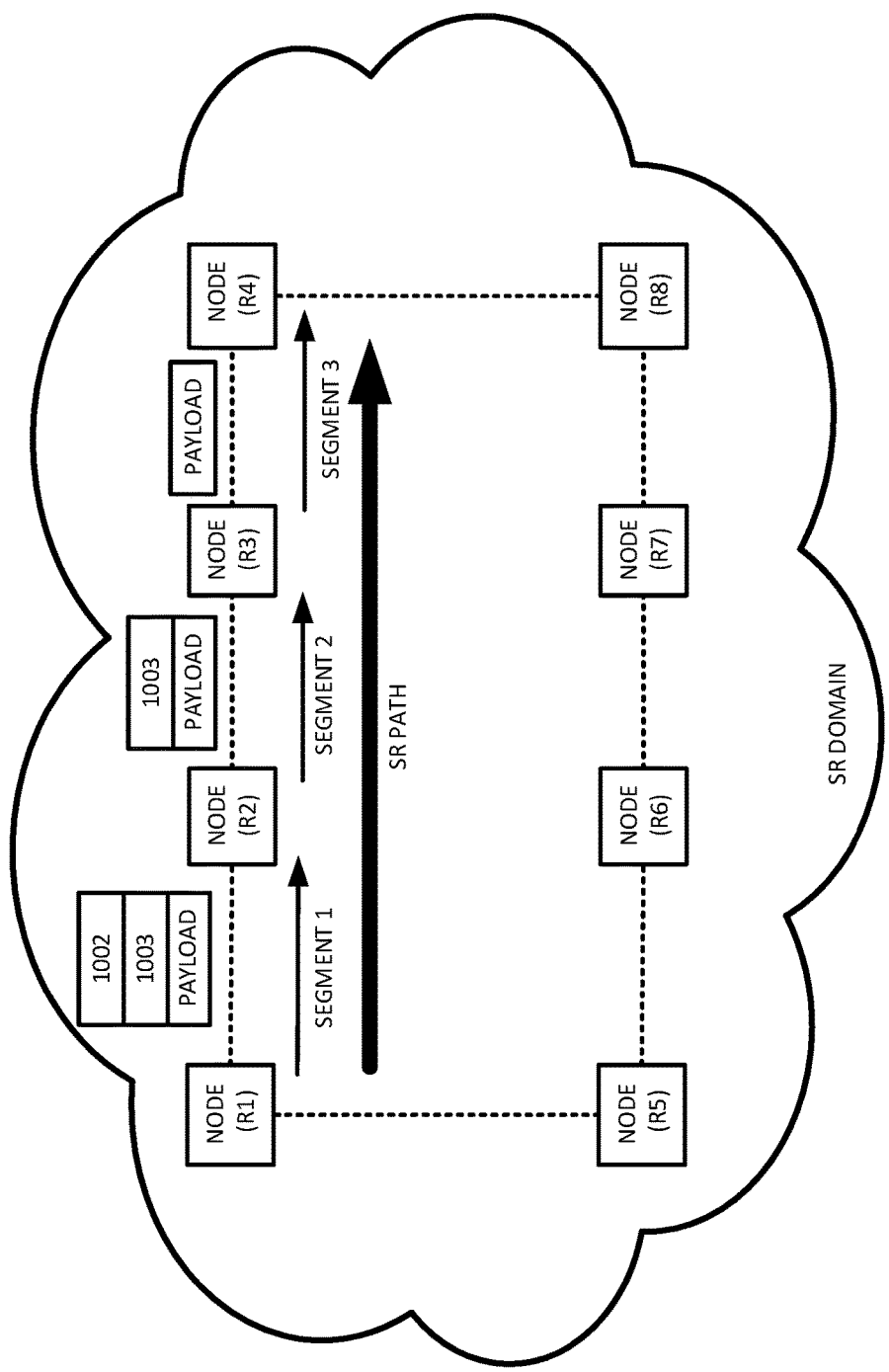
FIG. 5 is an example network used to illustrate the use of MPLS labels derived from adjacency segments.
Figure 6:
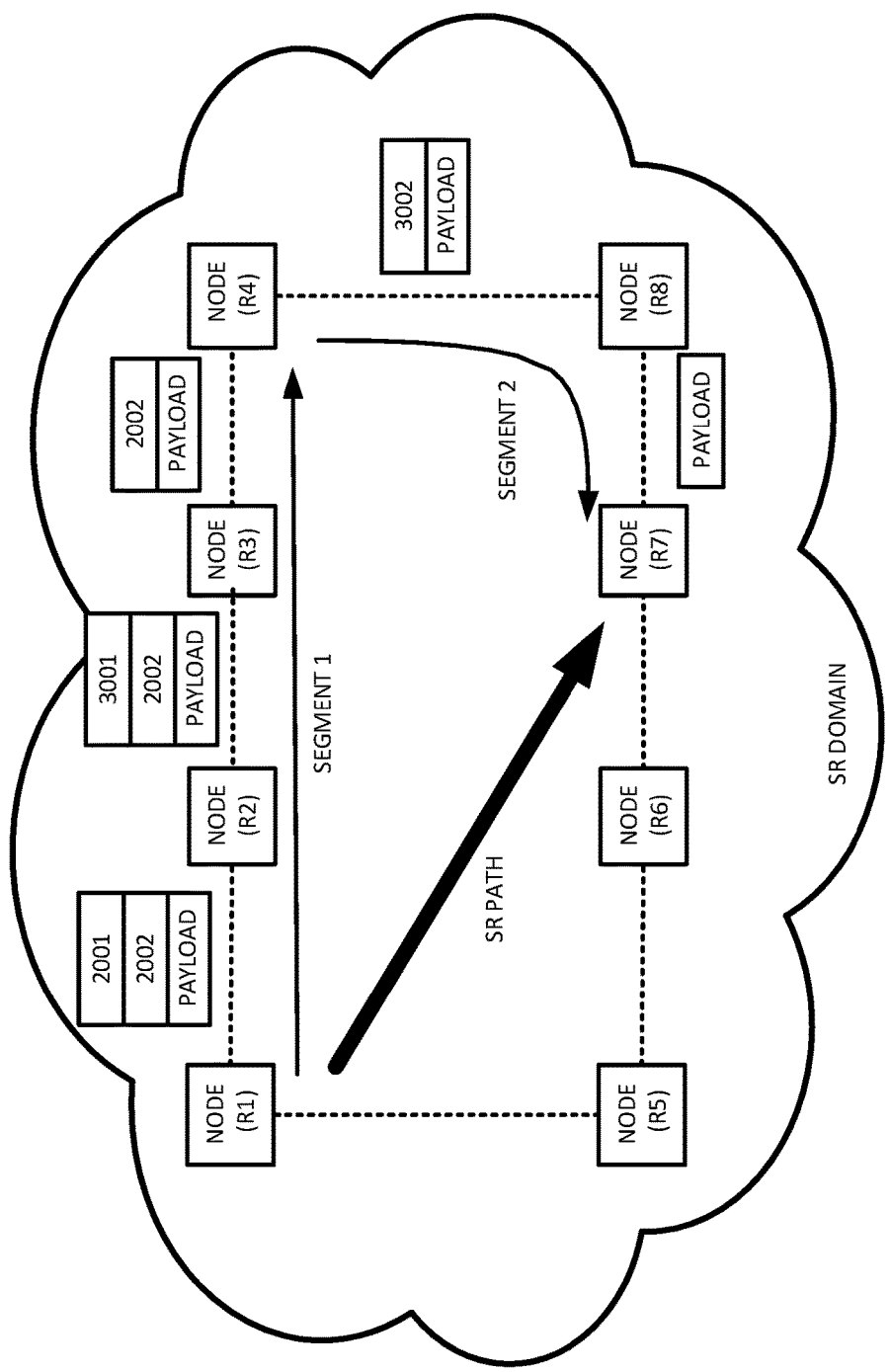
FIG. 6 is an example network used to illustrate the use of MPLS labels derived from prefix segments.

The present disclosure may involve novel methods, apparatus, message formats, and/or data structures for determining bandwidth guaranteed SR paths. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 Defininitions and Terminology

SG(R,D): the shortest multi-path directed acyclic graph from root R to destination D. This is analogous to the IGP computed shortest multi-path graph from R to D with no constraints on topology and when optimizing for the IGP metric.

CSG(R,D): the constrained shortest multi-path directed acyclic graph from R to destination D. (The classical CSPF algorithm is extended by example methods consistent with the present description to become multi-path aware and support constraints on the topology and optimization of an arbitrary path metric such as TE, latency, hops, etc.)

sl: SR segment-list that is composed of an ordered set of segments that resemble the path(s) that dataflow will follow. The segments of a segment-list are copied in a Segment Routing Header (SRH) that is imposed on top of data packets that are steered over the SR Path.

§ 4.2 Example Methods

Example methods consistent with the present description determine bandwidth guaranteed SR paths. Such method(s) may be referred to as "SR Bandwidth Constrained Path Algorithm" ("SR-BCPA"). Goals of such example methods include, for example:

determining a placement for the incoming traffic demand on link(s) where enough required resources are available to carry the share of traffic, so it minimizes the chances of congestion;

determining an SR Path that utilizes ECMP capable SR segments whenever possible and accounting for load balancing of traffic on the available ECMP path(s); and optimizing for the chosen path metric (e.g. delay, TE metric, hops, etc.) when selecting the set of feasible path(s).

Figure 7:
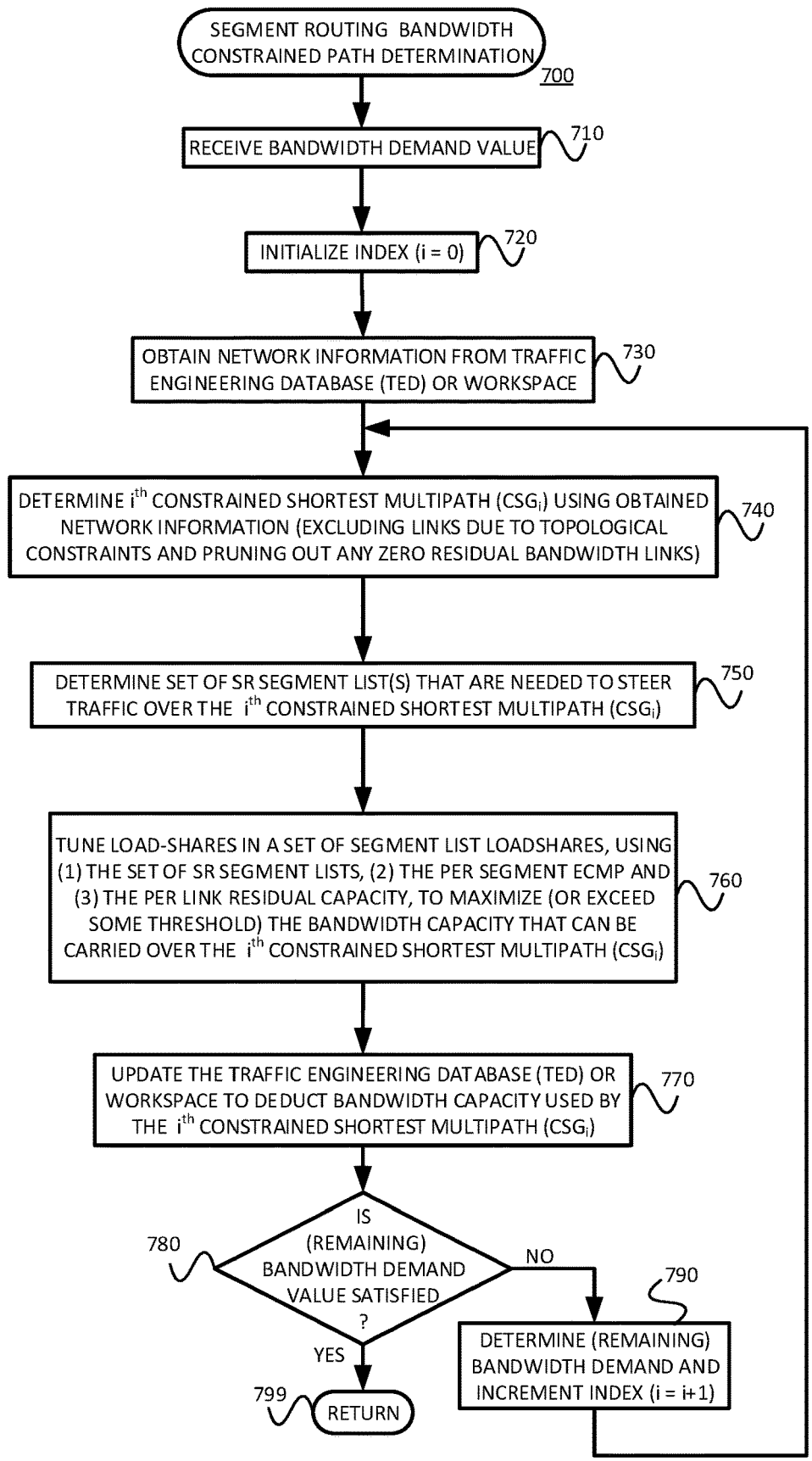
FIG. 7 is a flow diagram of an example method for determining SR bandwidth constrained path(s) in a manner consistent with the present description.

Referring to FIG. 7, an example method 700 consistent with the present description may be used to determine a bandwidth-guaranteed SR path. The example method 700 receives, as input, a bandwidth demand value. (Block 710) The example method 700 also initializes an index (e.g., i=0). (Block 720) The example method also obtains network information from a traffic engineering database (TED) (or from a workspace). (Block 730) The example method 700 then determines a constrained shortest multipath (CSG). (Block 740) The CSG may be formed of paths of equal cost of minimum accumulative path metric (e.g., after excluding link(s) due to any topological constraints (e.g. link affinities) and pruning out zero residual bandwidth links). The example method 700 then determines a set of SR segment-list(s) ($S_i=[sl_1^i, sl_2^i \ldots sl_n^i]$) that are needed to steer traffic over $CSG_i$ (e.g., using any known SR path to segment-list segment compression algorithm). (Block 750) Next, using $S_i$ and the per segment-list loadshare ($L_i=[l_1^i, l_2^i \ldots l_n^i]$), the per segment ECMP, and the per link residual capacity, the loadshares in $L_i$, are tuned such that the bandwidth capacity that can be carried over $CSG_i$ is maximized (or at least increased to exceed a threshold). (Block 760) The example method 700 may then update the TED (or a workspace) to deduct resources (e.g., bandwidth capacity) used on $CSG_i$. (Block 770) This may be done using $L_i$ and the per link traffic ratio on link(s) of $CSG_i$. Next, it is determined whether or not the (remaining) bandwidth demand can be satisfied by $CSG_i$. (Decision 780) If not (Decision 780, NO) (i.e., when the capacity of $CSG_i$ is smaller than the (remaining) demand, the index is incremented (e.g., i=i+1) (Block 790), and the method returns to block 740. If, on the other hand, the (remining) bandwidth demand can satisfied by $CSG_i$ (Decision 780, YES), the method 700 is left. (Node 799)

Referring back to block 730, example methods consistent with the present description may use topology information composed from the TED and the per link residual capacities (or available bandwidth). For SR path computation purposes, it is assumed the per link residual capacities are managed by a resource manager that keeps track of the per SR Path resource allocation on each traversed link and that gets reflected on the TED used for new path computations.

The following properties can be derived about the determined $CSG_i$:

$$CSG_i \Rightarrow \begin{cases} c_i = \text{path cost} \\ X_i = \text{total capacity} \\ S_i = [sl_1^i, sl_2^i \ldots sl_n^i] \\ L_i = [l_1^i, l_2^i, \ldots l_n^i] \end{cases}$$

where:

$X_i$: is the cost of the $i^{th}$ CSG, $X_i$: is the bandwidth capacity of the $i^{th}$ CSG, which is to be maximized (or increased to at least a determined threshold), $S_i$: is the set of segment-lists needed to steer traffic over the path(s) described by the $i^{th}$ CSG, $L_i$: is the per segment-list loadshare that the ingress uses to steer portion of the incoming demand on to $S_i$. These loadshares are tuned by the optimization problem to maximize the capacity of the $i^{th}$ CSG.

The weight distribution of the total incoming traffic on to each CSG can be represented as:

$$W = [w1, w2, \ldots wk], \text{ and } wi = \frac{Xi}{\sum_{k=0}^{K} Xk}$$

where $w_i$: is the load-share of traffic carried by the $i^{th}$ CSG.

The effective load carried by each segment-list sl can be computed as:

$$w_i \times L_i \forall sl(s) \text{ in } S_i.$$

§ 4.2.1 EXAMPLES OF OPERATIONS OF EXAMPLE METHODS

§ 4.2.1.1 First Example

Figure 8:
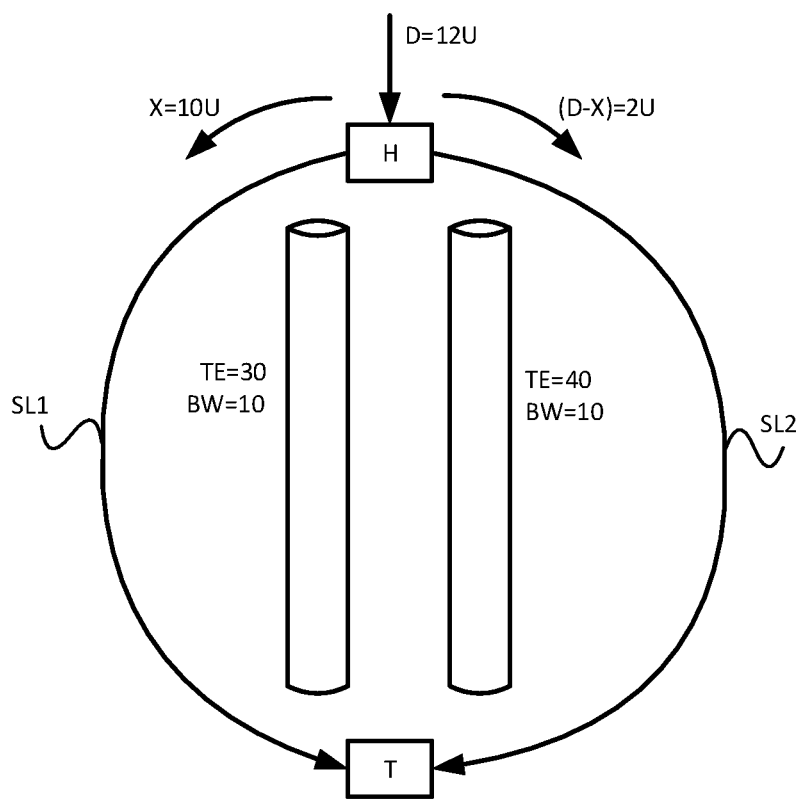
FIG. 8 illustrates a first example of operations of the example method of FIG. 7.

Referring to FIG. 8, consider the following incoming traffic demand D=12 U from "H" destined to "T". In the first iteration, H runs the example method 700 to find $CSG_1$ and succeeds to steer 10U over $CSG_1$:

$$CSG_1 \Rightarrow \begin{cases} \text{Cost } c_1 = 30 \\ \text{Capacity } X_1 = 10U \\ S_1 = [sl_1^1, sl_2^1 \ldots sl_n^1] \\ L_1 = [l_1^1, l_2^1, \ldots l_n^1] \end{cases}$$

Since, however the bandwidth demand is not yet satisfied (Recall, e.g., 780, NO) (10 U<12 U), the method 700 performs a second iteration. In the second iteration, H runs the example method 700 to find $CSPG_2$ and consequently steer the remainder 2 U over $CSG_2$:

$$CSG_2 \Rightarrow \begin{cases} \text{Cost } c_2 = 40 \\ \text{Capacity } X_2 = 10U \\ S_2 = [sl_1^2, sl_2^2 \ldots sl_n^2] \\ L_2 = [l_1^2, l_2^2, \ldots l_n^2] \end{cases}$$

H updates the weight distribution as:

$W \times L$, where $W = [w1, w2]$ and $w1 = 10/12$ and $w2 = 2/12$ and $L = [L_1, L_2]$ and $S = [S_1, S_2]$ describe the set of segment-list(s) found for each iteration.

§ 4.2.1.2 Second Example

Figure 9C:
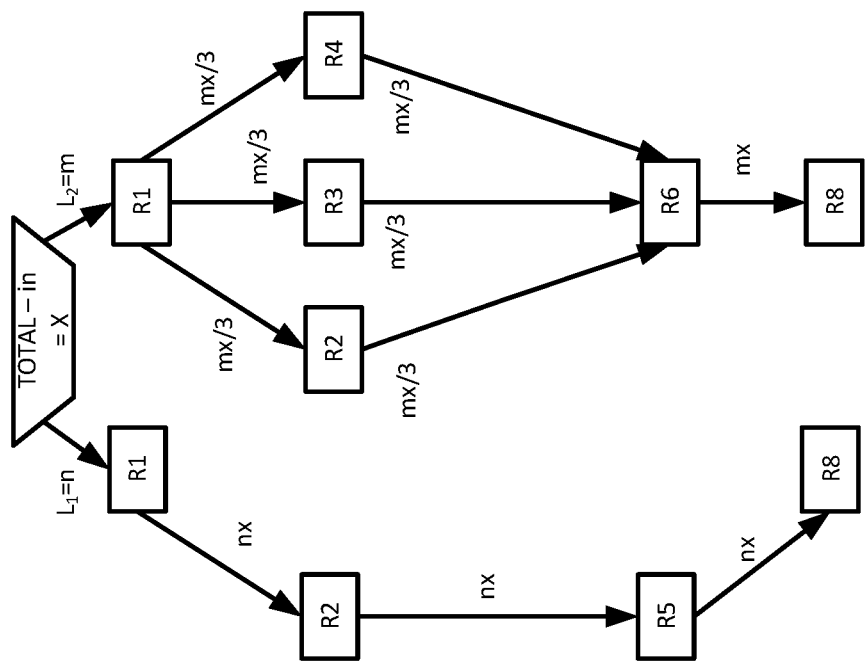
FIGS. 9A-9C illustrate a second example of operations of the example method of FIG. 7.
Figure 9B:
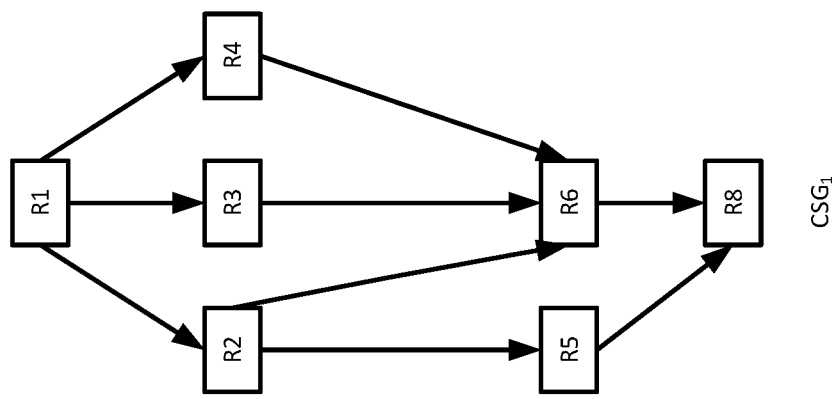
Figure 9A:
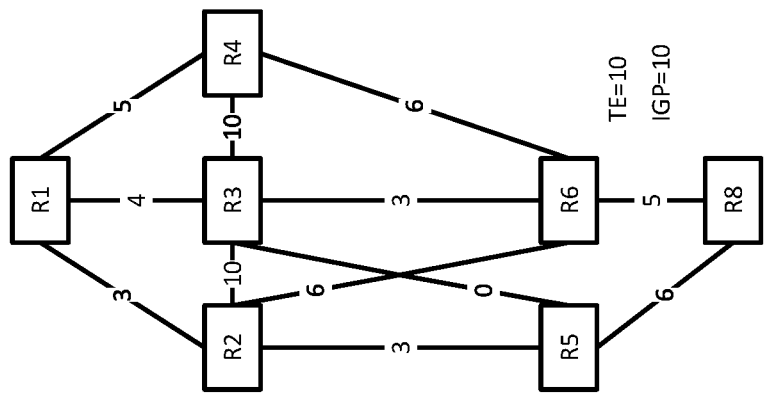

FIG. 9A depicts an example network topology. The residual bandwidth (e.g., available from TED or a workspace) of each link is marked. For example, the link connecting node (R1) with node (R2), and the link connecting node(R1) to node(R3) have residual bandwidths of 3 units, and 4 units respectively.

The example method 700 is performed to determine the maximum capacity X that node (R1) can send to node (R8) over the most optimal path(s). The steps involved include:

| STEP | DESCRIPTION |
|---|---|
| 1 | Compute $CSG_1$ (Recall 740 of FIG. 7.) |
| 2 | Determine S1, the set of segment-list(s) to steer traffic over $CSG_1$ (Recall 750 of FIG. 7.): <br> $sl_1^1 = \{\text{node-SID}(6), \text{node-SID}(8)\}$ <br> $sl_2^1 = \{\text{node-SID}(2), \text{node-SID}(5), \text{node-SID}(8)\}$ <br> and, <br> $S_1 = \{sl_1^1, sl_2^1\}$ <br> $L_1 = \{l_1, l_2\}$ |
| 3 | Formulate the set of constraint equalities and inequalities |
| 4 | Solve the optimization problem to maximize the capacity of $CSG_1$ and find: <br> L, and W (Recall 760 of FIG. 7.) |

The set of constraints equations can be derived as:

$$e_{12} \rightarrow \frac{l_2 x}{3} + l_1 x \leq 3 \quad (1)$$

$$e_{13} \rightarrow \frac{l_2 x}{3} \leq 4 \quad (2)$$

$$e_{14} \rightarrow \frac{l_2 x}{3} \leq 5 \quad (3)$$

$$e_{25} \rightarrow l_1 x \leq 3 \quad (4)$$

$$e_{26} \rightarrow \frac{l_2 x}{3} \leq 6 \quad (5)$$

$$e_{36} \rightarrow \frac{l_2 x}{3} \leq 3 \quad (6)$$

$$e_{46} \rightarrow \frac{l_2 x}{3} \leq 6 \quad (7)$$

$$e_{58} \rightarrow l_1 x \leq 6 \quad (8)$$

$$e_{68} \rightarrow l_2 x \leq 5 \quad (9)$$

Where $e_{xy}$ is the unidirectional edge (or link) connecting node(x) to node(y). Inequalities (1)-(3) are derived from the three (3) links exiting node R1. The denominator 3 indicates ECMP over the three links. Inequalities (5)-(7) are derived from the three (3) links entering node R6. Again, the denominator 3 indicates ECMP over the three links.

The inequalities or equations above can be simplified further to:

$$l_1 + l_2 = 1 \quad (10)$$

$$l_1 x \leq 3 \quad (11)$$

$$l_2 x \leq 4 \quad (12)$$

$$l_2 x + 3 l_1 x \leq 9 \quad (13)$$

Equation (10) is derived from the fact that the sum of the loads is always 1. Inequality (11) corresponds to inequality (6), and inequality (12) corresponds to inequality (9). Inequality (13) is derived from inequality (1). Expressions (10)-(13) can be programmatically solved (e.g., using non-linear programming such as Sequential Least SQuares Programming ("SLSQP")). The example below uses python. ($python compute_cap_weigths.py). In the example of FIGS. 9A-9C, the following values are generated:

Capacity (X)=6.333333327495734

$l_2$=0.7894736842874963

$l_1$=0.21052631571250358

§ 4.3 EXAMPLE ARCHITECTURES AND APPARATUS

The nodes may be forwarding devices such as routers for example. FIG. 10 illustrates two data forwarding systems 1010 and 1020 coupled via communications links 1030. The links may be physical links or "wireless" links. The data forwarding systems 1010,1020 may be routers for example. If the data forwarding systems 1010,1020 are example routers, each may include a control component (e.g., a routing engine) 1014,1024 and a forwarding component 1012,1022. Each data forwarding system 1010,1020 includes one or more interfaces 1016,1026 that terminate one or more communications links 1030.

As just discussed above, and referring to FIG. 11, some example routers 1100 include a control component (e.g., routing engine) 1110 and a packet forwarding component (e.g., a packet forwarding engine) 1190.

The control component 1110 may include an operating system (OS) kernel 1120, routing protocol process(es) 1130, label-based forwarding protocol process(es) 1140, interface process(es) 1150, user interface (e.g., command line interface) process(es) 1160, and chassis process(es) 1170, and may store routing table(s) 1139, label forwarding information 1145, and forwarding (e.g., route-based and/or label-based) table(s) 1180. As shown, the routing protocol process(es) 1130 may support routing protocols such as the routing information protocol ("RIP") 1131, the intermediate system-to-intermediate system protocol ("IS-IS") 1132, the open shortest path first protocol ("OSPF") 1133, the enhanced interior gateway routing protocol ("EIGRP") 1134 and the boarder gateway protocol ("BGP") 1135, and the label-based forwarding protocol process(es) 1140 may support protocols such as BGP 1135, the label distribution protocol ("LDP") 1136 and the resource reservation protocol ("RSVP") 1137. One or more components (not shown) may permit a user 1165 to interact with the user interface process(es) 1160. Similarly, one or more components (not shown) may permit an outside device to interact with one or more of the router protocol process(es) 1130, the label-based forwarding protocol process(es) 1140, the interface process(es) 1150, and the chassis process(es) 1170, via SNMP 1185, and such processes may send information to an outside device via SNMP 1185. Example embodiments consistent with the present description may be implemented in one or more routing protocol processes 1130.

The packet forwarding component 1190 may include a microkernel 1192, interface process(es) 1193, distributed ASICs 1194, chassis process(es) 1195 and forwarding (e.g., route-based and/or label-based) table(s) 1196.

Figure 11:
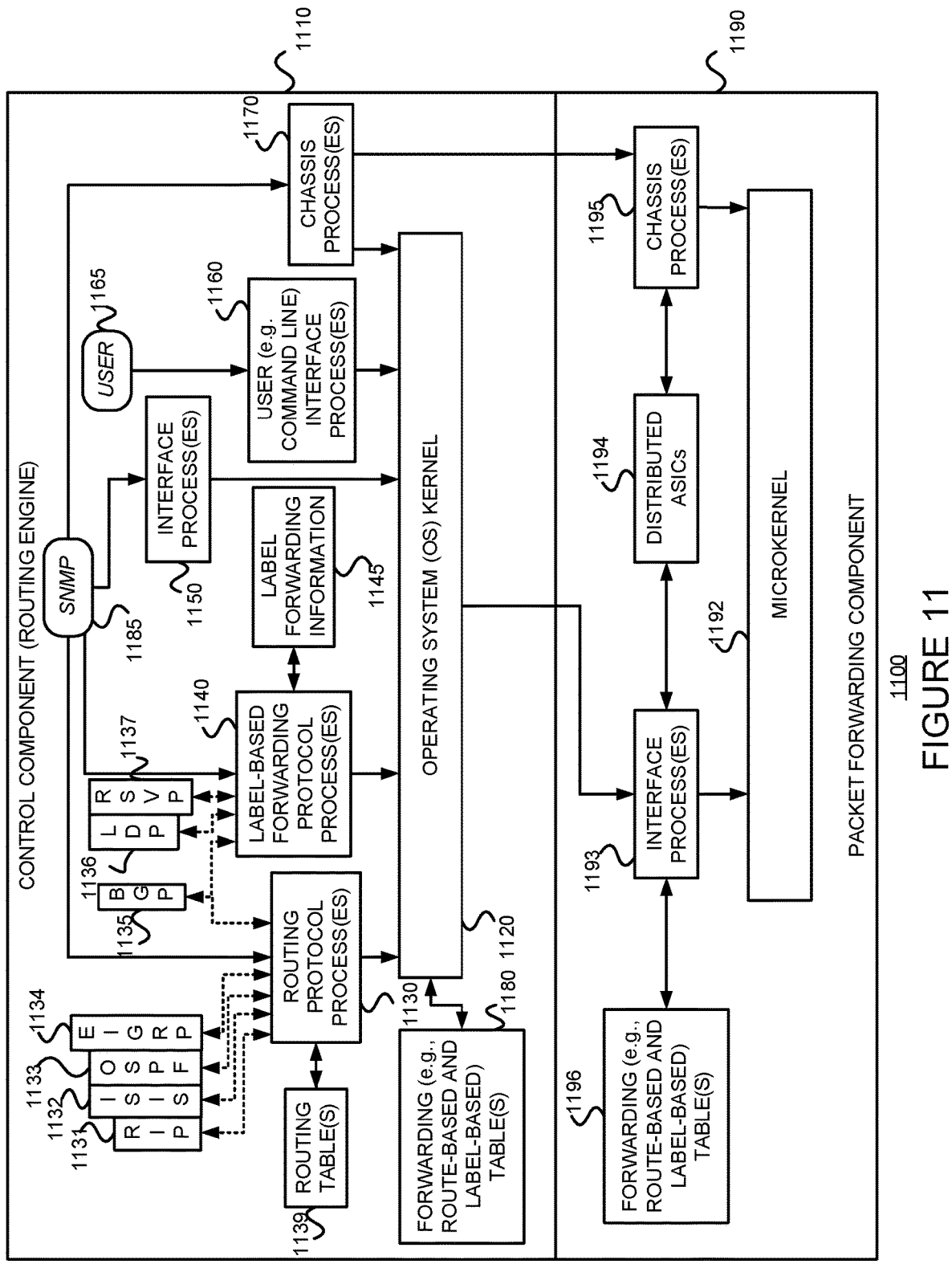
FIG. 11 is a block diagram of a router which may be used a node in an SR domain.

In the example router 1100 of FIG. 11, the control component 1110 handles tasks such as performing routing protocols, performing label-based forwarding protocols, control packet processing, etc., which frees the packet forwarding component 1190 to forward received packets quickly. That is, received control packets (e.g., routing protocol packets and/or label-based forwarding protocol packets) are not fully processed on the packet forwarding component 1190 itself, but are passed to the control component 1110, thereby reducing the amount of work that the packet forwarding component 1190 has to do and freeing it to process packets to be forwarded efficiently. Thus, the control component 1110 is primarily responsible for running routing protocols and/or label-based forwarding protocols, maintaining the routing tables and/or label forwarding information, sending forwarding table updates to the packet forwarding component 1190, and performing system management. The example control component 1110 may handle routing protocol packets, provide a management interface, provide configuration management, perform accounting, and provide alarms. The processes 1130, 1140, 1150, 1160 and 1170 may be modular, and may interact with the OS kernel 1120. That is, nearly all of the processes communicate directly with the OS kernel 1120. Using modular software that cleanly separates processes from each other isolates problems of a given process so that such problems do not impact other processes that may be running. Additionally, using modular software facilitates easier scaling.

Still referring to FIG. 11, the example OS kernel 1120 may incorporate an application programming interface ("API") system for external program calls and scripting capabilities. The control component 1110 may be based on an Intel PCI platform running the OS from flash memory, with an alternate copy stored on the router's hard disk. The OS kernel 1120 is layered on the Intel PCI platform and establishes communication between the Intel PCI platform and processes of the control component 1110. The OS kernel 1120 also ensures that the forwarding tables 1196 in use by the packet forwarding component 1190 are in sync with those 1180 in the control component 1110. Thus, in addition to providing the underlying infrastructure to control component 1110 software processes, the OS kernel 1120 also provides a link between the control component 1110 and the packet forwarding component 1190.

Referring to the routing protocol process(es) 1130 of FIG. 11, this process(es) 1130 provides routing and routing control functions within the platform. In this example, the RIP 1131, ISIS 1132, OSPF 1133 and EIGRP 1134 (and BGP 1135) protocols are provided. Naturally, other routing protocols may be provided in addition, or alternatively. Similarly, the label-based forwarding protocol process(es) 1140 provides label forwarding and label control functions. In this example, the LDP 1136 and RSVP 1137 (and BGP 1135) protocols are provided. Naturally, other label-based forwarding protocols (e.g., MPLS, SR, etc.) may be provided in addition, or alternatively. In the example router 1100, the routing table(s) 1139 is produced by the routing protocol process(es) 1130, while the label forwarding information 1145 is produced by the label-based forwarding protocol process(es) 1140.

Still referring to FIG. 11, the interface process(es) 1150 performs configuration of the physical interfaces (Recall, e.g., 1016 and 926 of FIG. 10.) and encapsulation.

The example control component 1110 may provide several ways to manage the router. For example, it 1110 may provide a user interface process(es) 1160 which allows a system operator 1165 to interact with the system through configuration, modifications, and monitoring. The SNMP 1185 allows SNMP-capable systems to communicate with the router platform. This also allows the platform to provide necessary SNMP information to external agents. For example, the SNMP 1185 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 1110, thereby avoiding slowing traffic forwarding by the packet forwarding component 1190.

Although not shown, the example router 1100 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 1160 via a console port, an auxiliary port, and/or a management Ethernet port The packet forwarding component 1190 is responsible for properly outputting received packets as quickly as possible. If there is no entry in the forwarding table for a given destination or a given label and the packet forwarding component 1190 cannot perform forwarding by itself, it 1190 may send the packets bound for that unknown destination off to the control component 1110 for processing. The example packet forwarding component 1190 is designed to perform Layer 2 and Layer 3 switching, route lookups, and rapid packet forwarding.

As shown in FIG. 11, the example packet forwarding component 1190 has an embedded microkernel 1192, interface process(es) 1193, distributed ASICs 1194, and chassis process(es) 1195, and stores a forwarding (e.g., route-based and/or label-based) table(s) 1196. The microkernel 1192 interacts with the interface process(es) 1193 and the chassis process(es) 1195 to monitor and control these functions. The interface process(es) 1192 has direct communication with the OS kernel 1120 of the control component 1110. This communication includes forwarding exception packets and control packets to the control component 1110, receiving packets to be forwarded, receiving forwarding table updates, providing information about the health of the packet forwarding component 1190 to the control component 1110, and permitting configuration of the interfaces from the user interface (e.g., CLI) process(es) 1160 of the control component 1110. The stored forwarding table(s) 1196 is static until a new one is received from the control component 1110. The interface process(es) 1193 uses the forwarding table(s) 1196 to look up next-hop information. The interface process(es) 1193 also has direct communication with the distributed ASICs 1194. Finally, the chassis process(es) 1195 may communicate directly with the microkernel 1192 and with the distributed ASICs 1194.

Figure 12:
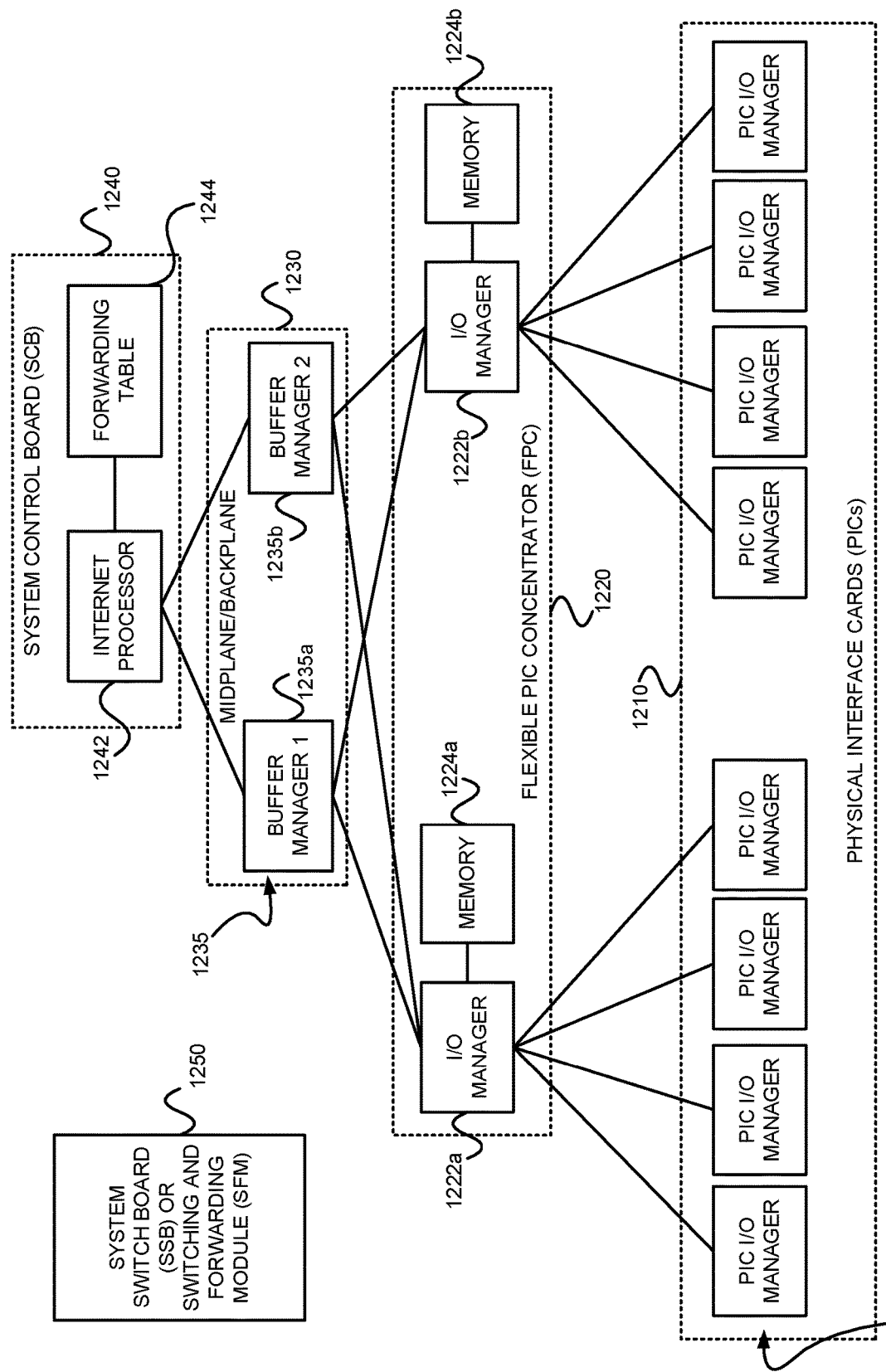
FIG. 12 is an example architecture in which ASICS may be distributed in a packet forwarding component to divide the responsibility of packet forwarding.

Referring back to distributed ASICs 1194 of FIG. 11, FIG. 12 is an example of how the ASICS may be distributed in the packet forwarding component 1190 to divide the responsibility of packet forwarding. As shown in FIG. 12, the ASICs of the packet forwarding component 1190 may be distributed on physical interface cards ("PICs") 1210, flexible PIC concentrators ("FPCs") 1220, a midplane or backplane 1230, and a system control board(s) 1240 (for switching and/or forwarding). Switching fabric is also shown as a system switch board ("SSB"), or a switching and forwarding module ("SFM") 1250. Each of the PICs 1210 includes one or more PIC I/O managers 1215. Each of the FPCs 1220 includes one or more I/O managers 1222, each with an associated memory 1224. The midplane/backplane 1230 includes buffer managers 1235a, 1235b. Finally, the system control board 1240 includes an internet processor 1242 and an instance of the forwarding table 1244 (Recall, e.g., 1196 of FIG. 11).

Still referring to FIG. 12, the PICs 1210 contain the interface ports. Each PIC 1210 may be plugged into an FPC 1220. Each individual PIC 1210 may contain an ASIC that handles media-specific functions, such as framing or encapsulation. Some example PICs 1210 provide SDH/SONET, ATM, Gigabit Ethernet, Fast Ethernet, and/or DS3/E3 interface ports.

An FPC 1220 can contain from one or more PICs 1210, and may carry the signals from the PICs 1210 to the midplane/backplane 1230 as shown in FIG. 12.

The midplane/backplane 1230 holds the line cards. The line cards may connect into the midplane/backplane 1230 when inserted into the example router's chassis from the front. The control component (e.g., routing engine) 1110 may plug into the rear of the midplane/backplane 1230 from the rear of the chassis. The midplane/backplane 1230 may carry electrical (or optical) signals and power to each line card and to the control component 1110.

The system control board 1240 may perform forwarding lookup. It 1240 may also communicate errors to the routing engine. Further, it 1240 may also monitor the condition of the router based on information it receives from sensors. If an abnormal condition is detected, the system control board 1240 may immediately notify the control component 1110.

Referring to FIGS. 12, 13A and 13B, in some exemplary routers, each of the PICs 1210,1110' contains at least one I/O manager ASIC 1215 responsible for media-specific tasks, such as encapsulation. The packets pass through these I/O ASICs on their way into and out of the router. The I/O manager ASIC 1215 on the PIC 1210,1110' is responsible for managing the connection to the I/O manager ASIC 1222 on the FPC 1220,1120', managing link-layer framing and creating the bit stream, performing cyclical redundancy checks (CRCs), and detecting link-layer errors and generating alarms, when appropriate. The FPC 1220 includes another I/O manager ASIC 1222. This ASIC 1222 takes the packets from the PICs 1210 and breaks them into (e.g., 74-byte) memory blocks. This FPC I/O manager ASIC 1222 sends the blocks to a first distributed buffer manager (DBM) 1235a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 1235a' manages and writes packets to the shared memory 1224 across all FPCs 1220. In parallel, the first DBM ASIC 1235a' also extracts information on the destination of the packet and passes this forwarding-related information to the Internet processor 1242/1142'. The Internet processor 1242/1142' performs the route lookup using the forwarding table 1244 and sends the information over to a second DBM ASIC 1235b'. The Internet processor ASIC 1242/1142' also collects exception packets (i.e., those without a forwarding table entry) and sends them to the control component 1110. The second DBM ASIC 1235b' then takes this information and the 74-byte blocks and forwards them to the I/O manager ASIC 1222 of the egress FPC 1220/1120' (or multiple egress FPCs, in the case of multicast) for reassembly. (Thus, the DBM ASICs 1235a' and 1235b' are responsible for managing the packet memory 1224 distributed across all FPCs 1220/1120', extracting forwarding-related information from packets, and instructing the FPC where to forward packets.)

The I/O manager ASIC 1222 on the egress FPC 1220/1120' may perform some value-added services. In addition to incrementing time to live ("TTL") values and re-encapsulating the packet for handling by the PIC 1210, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1222 on the egress FPC 1220/1120' may be responsible for receiving the blocks from the second DBM ASIC 1235b', incrementing TTL values, queuing a pointer to the packet, if necessary, before applying CoS rules, re-encapsulating the blocks, and sending the encapsulated packets to the PIC I/O manager ASIC 1215.

Figure 14:
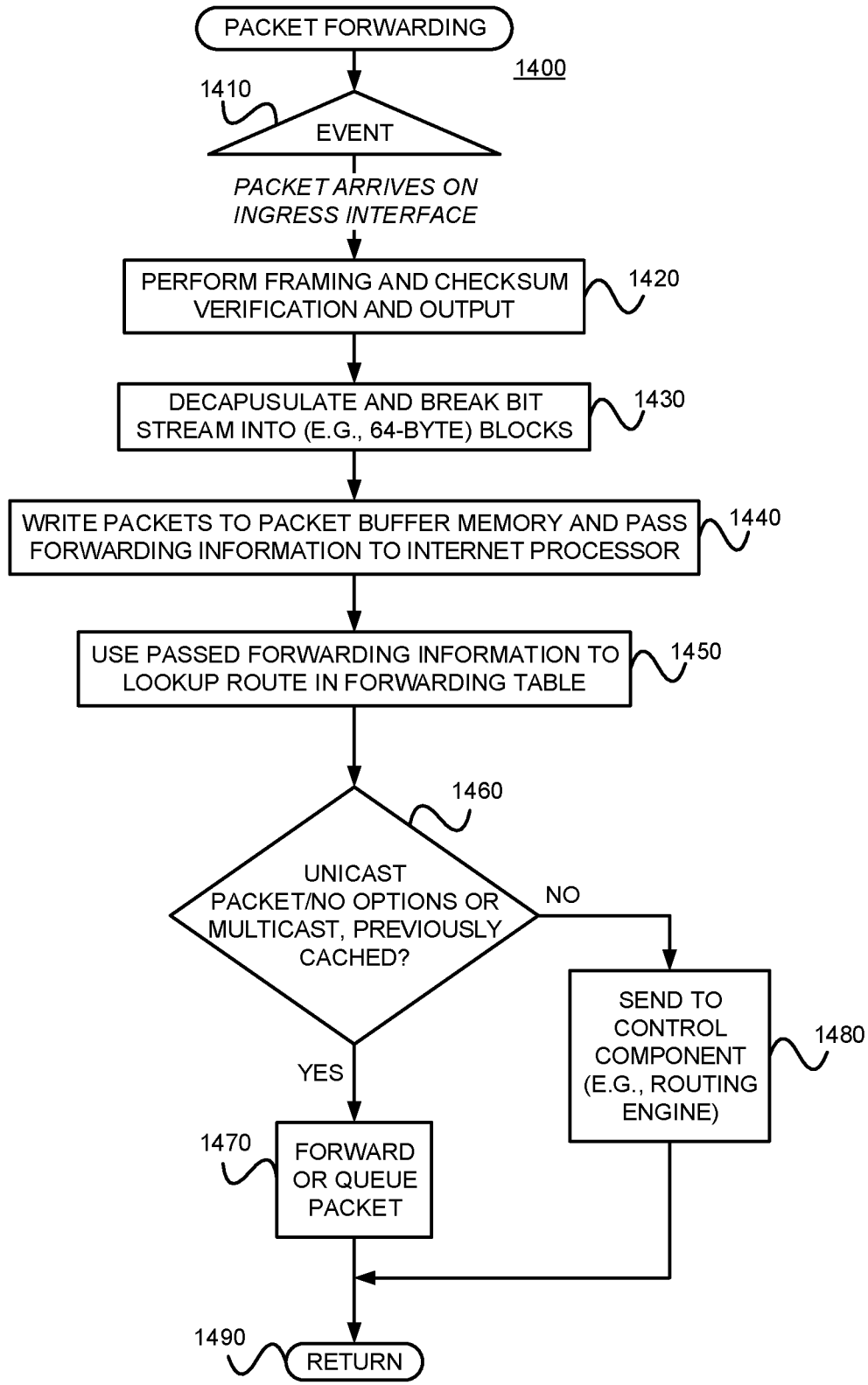
FIG. 14 is a flow diagram of an example method for providing packet forwarding in an example router.

FIG. 14 is a flow diagram of an example method 1400 for providing packet forwarding in the example router. The main acts of the method 1400 are triggered when a packet is received on an ingress (incoming) port or interface. (Event 1410) The types of checksum and frame checks that are required by the type of medium it serves are performed and the packet is output, as a serial bit stream. (Block 1420) The packet is then decapsulated and parsed into (e.g., 64-byte) blocks. (Block 1430) The packets are written to buffer memory and the forwarding information is passed on the Internet processor. (Block 1440) The passed forwarding information is then used to lookup a route in the forwarding table. (Block 1450) Note that the forwarding table can typically handle unicast packets that do not have options (e.g., accounting) set, and multicast packets for which it already has a cached entry. Thus, if it is determined that these conditions are met (YES branch of Decision 1460), the packet forwarding component finds the next hop and egress interface, and the packet is forwarded (or queued for forwarding) to the next hop via the egress interface (Block 1470) before the method 1400 is left (Node 1490) Otherwise, if these conditions are not met (NO branch of Decision 1460), the forwarding information is sent to the control component 1110 for advanced forwarding resolution (Block 1480) before the method 1400 is left (Node 1490).

Referring back to block 1470, the packet may be queued. Actually, as stated earlier with reference to FIG. 12, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1222 may send a request for the packet to the second DBM ASIC 1235b. The DBM ASIC 1235 reads the blocks from shared memory and sends them to the I/O manager ASIC 1222 on the FPC 1220, which then serializes the bits and sends them to the media-specific ASIC of the egress interface. The I/O manager ASIC 1215 on the egress PIC 1210 may apply the physical-layer framing, perform the CRC, and send the bit stream out over the link.

Referring back to block 1480 of FIG. 14, as well as FIG. 12, regarding the transfer of control and exception packets, the system control board 1240 handles nearly all exception packets. For example, the system control board 1240 may pass exception packets to the control component 1110.

Although example embodiments consistent with the present invention may be implemented on the example routers of FIG. 10 or 11, embodiments consistent with the present invention may be implemented on communications network nodes (e.g., routers, switches, etc.) having different architectures, or even a remote server (e.g., a path computation element ("PCE")). More generally, embodiments consistent with the present invention may be implemented on an example system 1400 as illustrated on FIG. 15.

Figure 15:
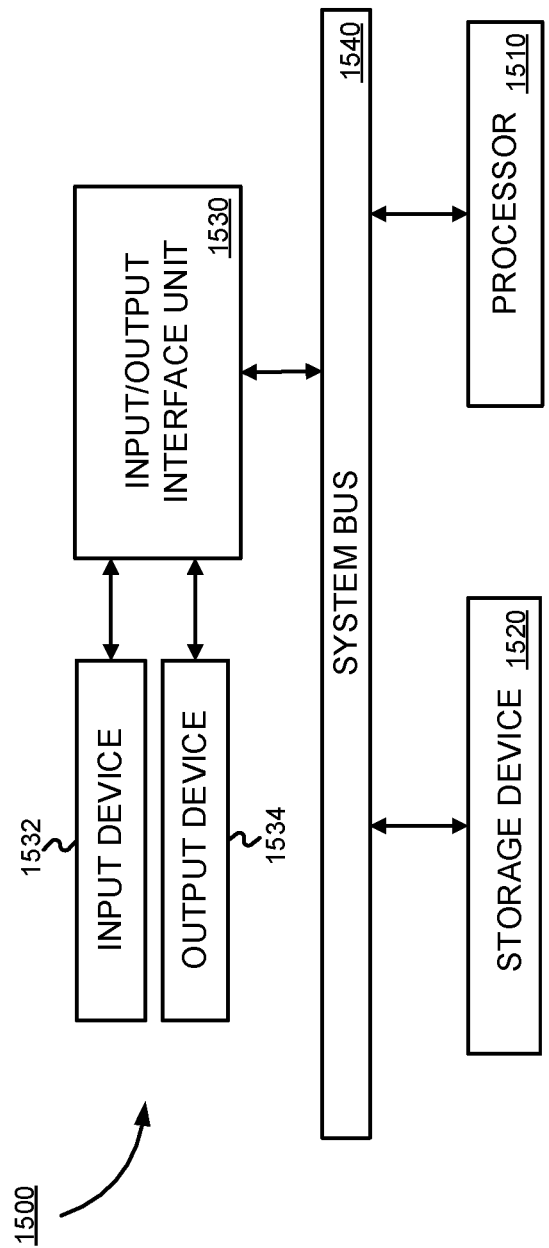
FIG. 15 is a block diagram of an exemplary machine 1500 that may perform one or more of the processes described, and/or store information used and/or generated by such processes.

FIG. 15 is a block diagram of an exemplary machine 1500 that may perform one or more of the processes described, and/or store information used and/or generated by such processes. The exemplary machine 1500 includes one or more processors 1510, one or more input/output interface units 1530, one or more storage devices 1520, and one or more system buses and/or networks 1540 for facilitating the communication of information among the coupled elements. One or more input devices 1532 and one or more output devices 1534 may be coupled with the one or more input/output interfaces 1530. The one or more processors 1510 may execute machine-executable instructions (e.g., C or C++ running on the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1520 and/or may be received from an external source via one or more input interface units 1530. The machine executable instructions may be stored as various software modules, each module performing one or more operations. Functional software modules are examples of components of the invention.

In some embodiments consistent with the present invention, the processors 1510 may be one or more microprocessors and/or ASICs. The bus 1540 may include a system bus. The storage devices 1520 may include system memory, such as read only memory (ROM) and/or random access memory (RAM). The storage devices 1520 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present invention (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.4 Refinements, Alternatives and Extensions

Figure 17:
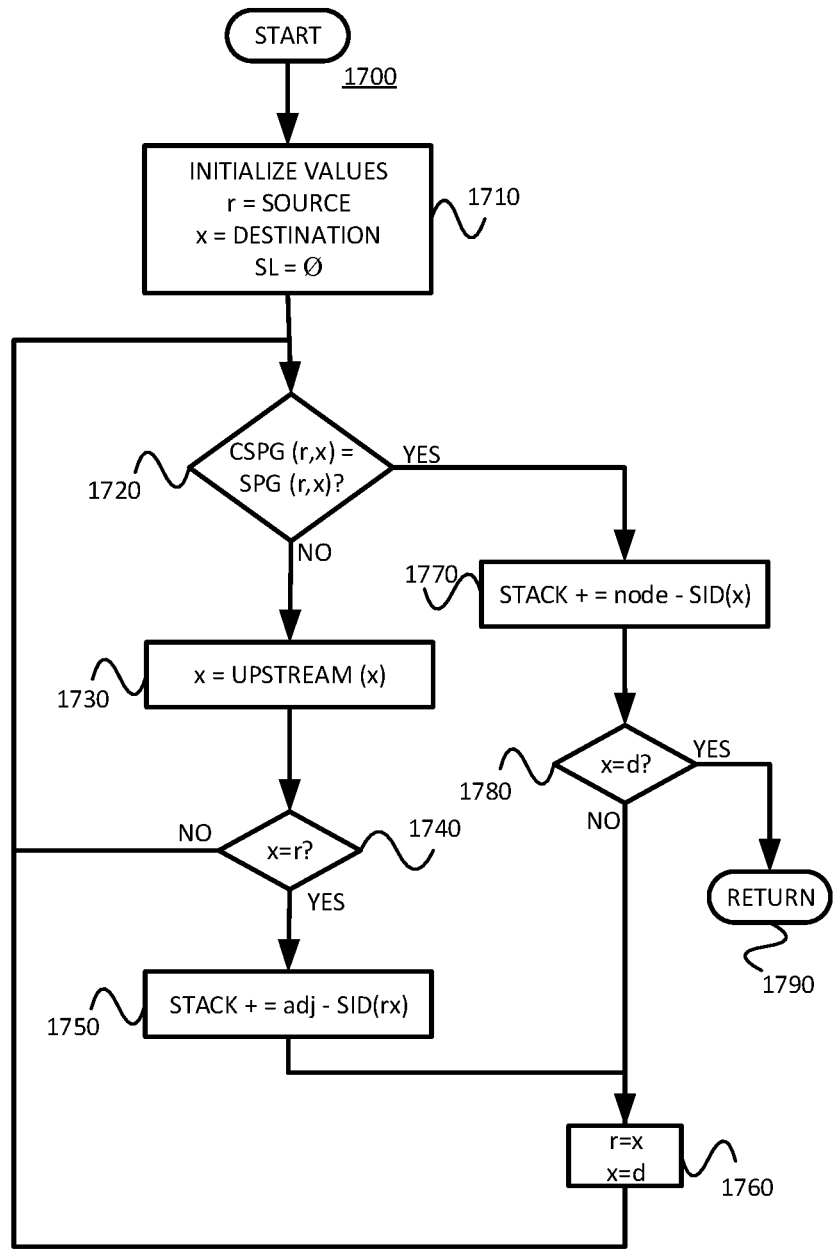

Referring back to block 750 of FIG. 7, the set of SR segment list(s) need to steer traffic over the $i^{th}$ CSG may be determined using the technique illustrated in FIGS. 16 and 17. Block reference numbers used in the flow diagram of FIG. 17 are annotated onto the pseudo code of FIG. 16.

Referring back to block 760 of FIG. 7, the loadshares may be tuned to maximize the bandwidth capacity that may be carried over the $i^{th}$ CSG is a non-linear programming problem that may be solved using Sequential Least SQuares Programming ("SLSQP").

Figure 18:
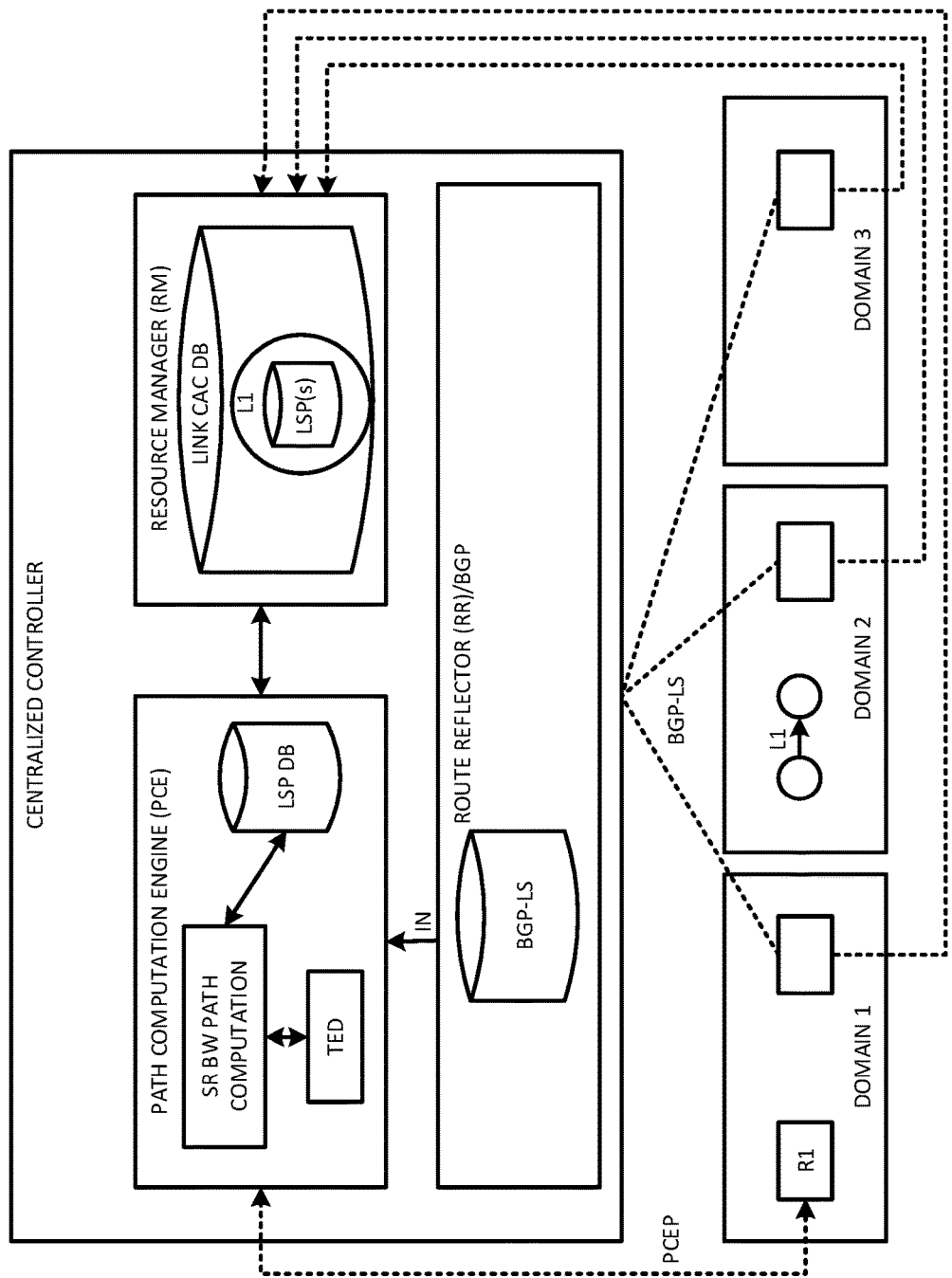
FIGS. 18-20 illustrate alternative architectures for implementing an example method consistent with the present description.
Figure 19:
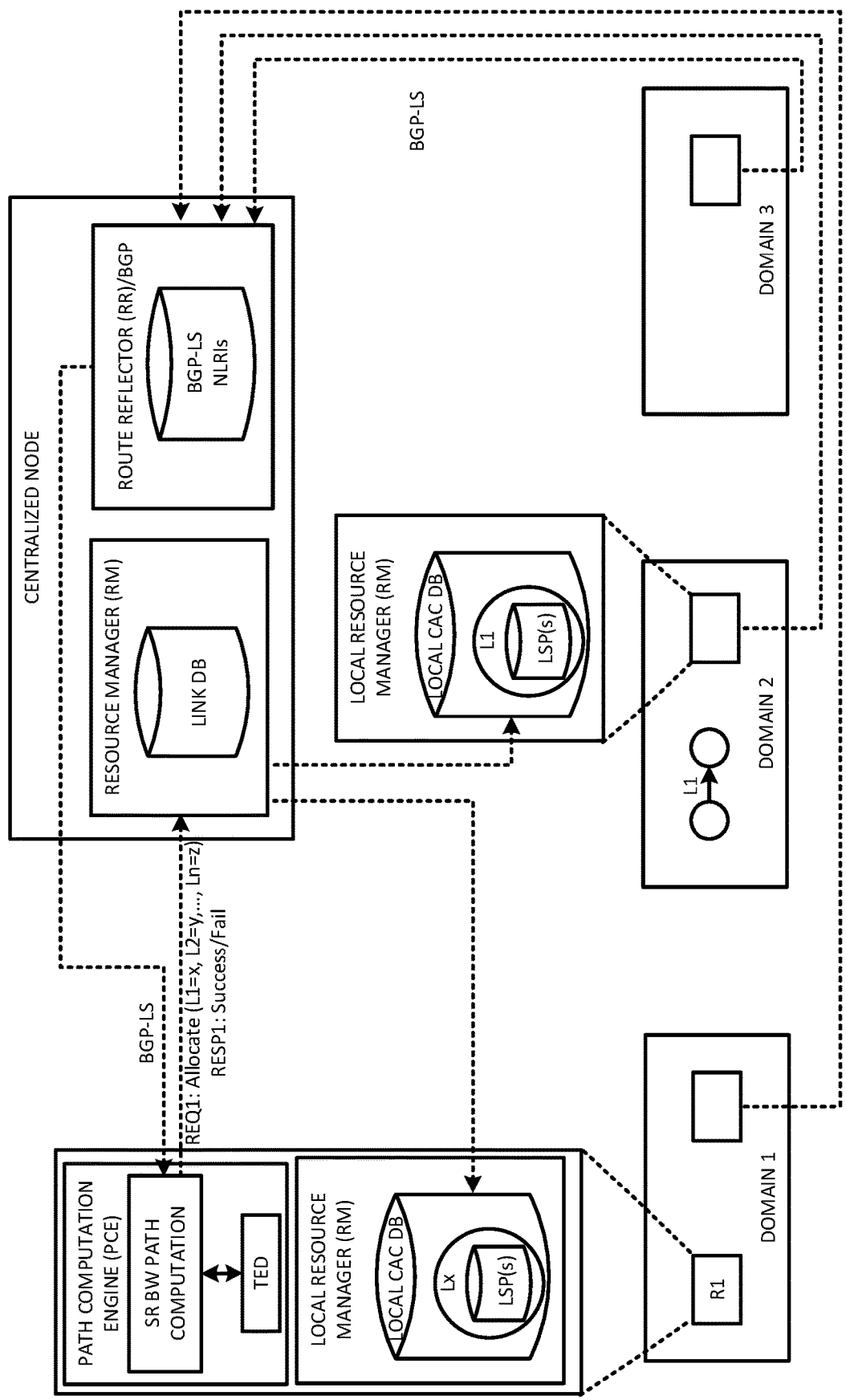
Figure 20:
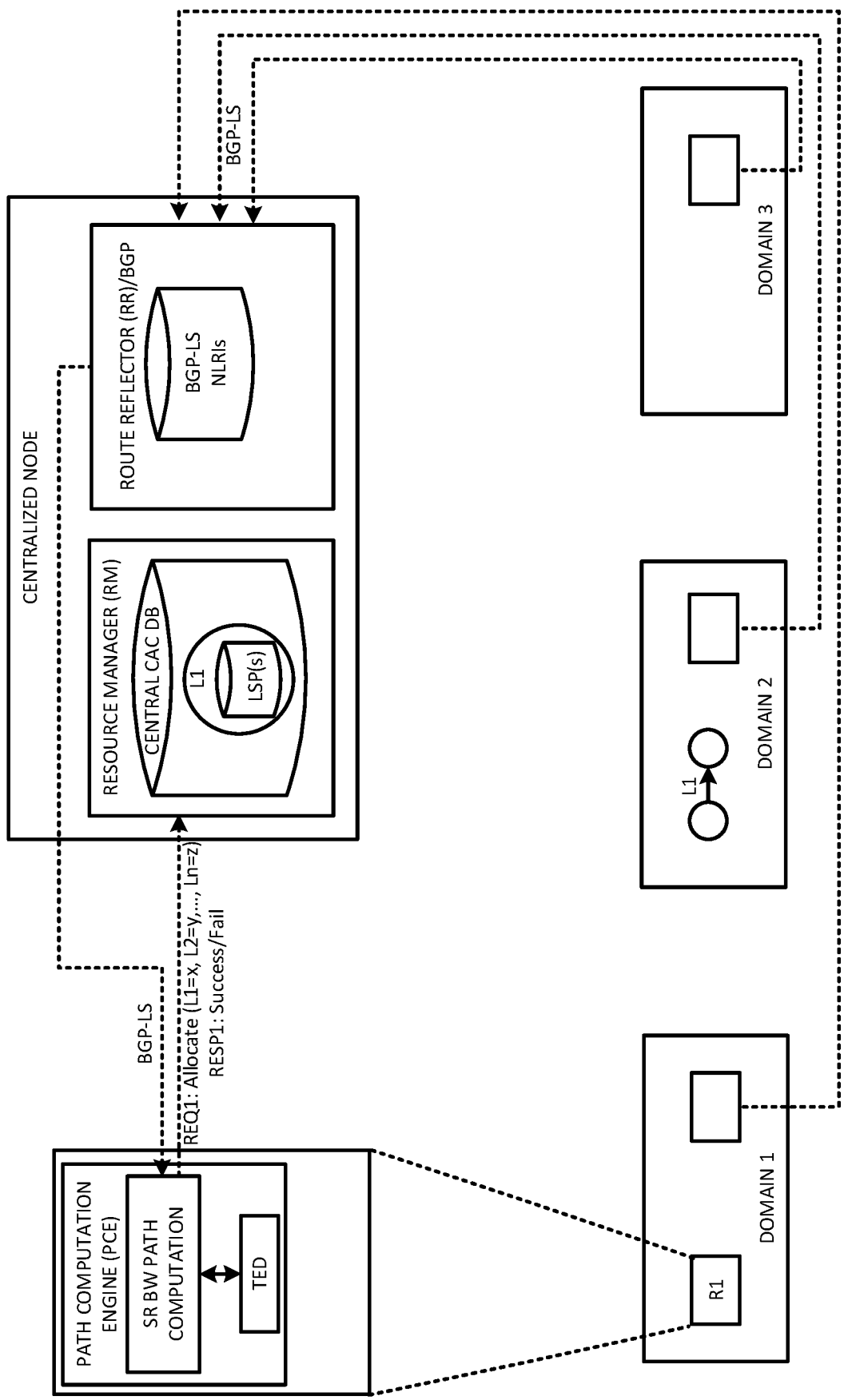

FIGS. 18-20 illustrate different architectures that may be used to implement an example method consistent with the present description. More specifically, FIG. 18 illustrates a centralized architecture in which a centralized controller includes a path computation element (PCE), a resource manager (RM) and a BGP route reflector (RR). The PCE can communicate with the RM and the BGP RR using, for example, Google's open source remote procedure call (gRPC) and/or the PCE protocol (PCEP). The PCE includes a segment routing (SR) bandwidth (BW) path computation engine which uses and/or generates information in a traffic engineering database (TED) and a label switched path (LSP) database. The RM includes a link CAC (Call Admission Control, for performing admission control on the link(s) that constitute the SR Path) database. More specifically, the RM includes a link database of SR link(s) in the network and where the SR path reservation(s) and admission is performed and maintained on the traversed link(s). The BGP RR may store BGP link state information. As shown, R1 in domain 1 can communicate with the PCE using, for example, PCEP. Local state information, such as link capacity, link utilization, and per SID traffic rates can be communicated from each of the domains to the RM. This may be done using, for example, BGP-LS, Telemetry, and/or SNMP. Further, information can be exchanged between each of the domains and the BGP RR using, for example, BGP-LS.

FIG. 19 illustrates an architecture using distributed computation and distributed CAC. In this example, the centralized node includes a central instance of the RM and the BGP RR. As shown, domain 1 includes the PCE and local RM with a local instance of the CAC, while domain 2 includes a local RM with a local instance of the CAC. The SR BW path computation module may communicate with the BGP RR using, for example, BGP-LS. The local instances of the RM may communicate with the centralized RM using, for example, gRPC, PCEP, and/or BGP. Finally, local state information, such as link capacity, link utilization, and per SID traffic rates can be communicated from each of the domains to the BGP-RR. This may be done using, for example, BGP-LS.

Finally, FIG. 20 illustrates an architecture using distributed computation and a centralized CAC. In this example, the centralized node includes the RM and the BGP RR. As shown, domain 1 includes the PCE. The SR BW path computation module may communicate with the BGP RR using, for example, BGP-LS. The SR BW path computation module may communicate with the RM to request certain allocations, and receive a response to its request(s). Local state information, such as link capacity, link utilization, and per SID traffic rates can be communicated from each of the domains to the BGP-RR. This may be done using, for example, BGP-LS.

§ 4.5 CONCLUSIONS

Example embodiments consistent with the present description allows the setup of SR path(s) with bandwidth guarantees in SR network.

Example embodiments consistent with the present description are applicable to SRv6 and SR-MPLS dataplane technologies.

Example embodiments consistent with the present description enable auto-bandwidth to work for SR Path(s).

Example embodiments consistent with the present description can work on a central computation server, where per path reservations are managed centrally.

Example embodiments consistent with the present description are compatible with RSVP-TE LSP and bandwidth reservations in the same network.

What is claimed is:

1. A computer-implemented method for determining at least one bandwidth-guaranteed segment routing (SR) path through a network from an ingress device to an egress device, the computer-implemented method comprising:
   a) receiving, as input, a bandwidth demand value;
   b) obtaining network information;

c) determining a constrained shortest multipath ($CSG_i$) from the ingress device to the egress device;
d) determining a set of SR segment-list(s) ($S_i=[sl_1^i, sl_2^i \ldots sl_n^i]$) that are needed to steer traffic over $CSG_i$; and
e) tuning each of a plurality of loadshares in a set of segment link loadshares $L_i$ that the ingress device uses to steer portions of the bandwidth demand to the egress device, using all of
1) $S_i$ and the per segment-list loadshare ($L_i=[l_1^i, l_2^i, \ldots l_n^i]$),
2) the per segment equal cost multipath ("ECMP"), and
3) the per link residual capacity,
such that the bandwidth capacity over $CSG_i$ is maximized or such that the bandwidth capacity meets a threshold value.

2. The computer-implemented method of claim 1 wherein the $CSG_i$ is formed of paths of equal cost of minimum accumulative path metric.

3. The computer-implemented method of claim 1 wherein the $CSG_i$ is formed of paths of equal cost of minimum accumulative path metric after excluding link(s) due to any topological constraints.

4. The computer-implemented method of claim 1 wherein the $CSG_i$ is formed of paths of equal cost of minimum accumulative path metric after pruning out zero residual bandwidth links.

5. The computer-implemented method of claim 1 wherein the $CSG_i$ is formed of paths of equal cost of minimum accumulative path metric.

6. The computer-implemented method of claim 1 wherein the act of obtaining network information is performed by accessing information in a traffic engineering database (TED), the computer-implemented method further comprising:
f) updating the TED or a workspace including information from the TED, to deduct bandwidth capacity used on $CSG_i$.

7. The computer-implemented method of claim 6 further comprising:
g) determining whether or not the (remaining) bandwidth demand is satisfied by $CSG_i$; and
h) responsive to a determination that the capacity of $CSG_i$ is smaller than the (remaining) demand, repeating the acts (a)-(e).

8. The computer-implemented method of claim 1 wherein the act of tuning the loadshares in $L_i$, using $S_i$ and the per segment-list loadshare ($L_i=[l_1^i, l_2^i, \ldots l_n^i]$), the per segment equal cost multipath ("ECMP"), and the per link residual capacity, such that the bandwidth capacity that is carried over $CSG_i$ is maximized, uses a sequential least squares programming procedure.

9. A router serving as an ingress of a SR path and comprising:
a) at least one routing processor; and
b) a non-transitory computer readable medium storing processor executable instructions which, when executed by the at least one routing processor, cause the at least one routing processor to determine at least one bandwidth-guaranteed segment routing (SR) path through a network from the router serving as the ingress of the SR path to an egress router, by performing a method comprising:
a) receiving, as input, a bandwidth demand value;
b) obtaining network information;
c) determining a constrained shortest multipath ($CSG_i$) from the router serving as the ingress of the SR path to the egress router;
d) determining a set of SR segment-list(s) ($S_i=[sl_1^i, sl_2^i \ldots sl_n^i]$) that are needed to steer traffic over $CSG_i$; and
e) tuning each of a plurality of loadshares in a set of segment link loadshares $L_i$ that the router serving at the ingress of the SR path uses to steer portions of the bandwidth demand to the egress router, using all of
1) $S_i$ and the per segment-list loadshare ($L_i=[l_1^i, l_2^i, \ldots l_n^i]$),
2) the per segment equal cost multipath ("ECMP"), and
3) the per link residual capacity, such that the bandwidth capacity over $CSG_i$ is maximized or such that the bandwidth capacity meets a threshold value.

10. The router of claim 9 wherein the $CSG_i$ is formed of paths of equal cost of minimum accumulative path metric.

11. The router of claim 9 wherein the $CSG_i$ is formed of paths of equal cost of minimum accumulative path metric after excluding link(s) due to any topological constraints.

12. The router of claim 9 wherein the $CSG_i$ is formed of paths of equal cost of minimum accumulative path metric after pruning out zero residual bandwidth links.

13. The router of claim 9 wherein the $CSG_i$ is formed of paths of equal cost of minimum accumulative path metric.

14. The router of claim 9 wherein the act of obtaining network information is performed by accessing information in a traffic engineering database (TED), the method further comprising:
f) updating the TED or a workspace including information from the TED, to deduct bandwidth capacity used on $CSG_i$.

15. The router of claim 14 wherein the method further comprises:
g) determining whether or not the (remaining) bandwidth demand is satisfied by $CSG_i$; and
h) responsive to a determination that the capacity of $CSG_i$ is smaller than the (remaining) demand, repeating the acts (a)-(e).

16. The router of claim 9 wherein the act of tuning the loadshares in $L_i$, using $S_i$ and the per segment-list loadshare ($L_i=[l_1^i, l_2^i, \ldots l_n^i]$), the per segment equal cost multipath ("ECMP"), and the per link residual capacity, such that the bandwidth capacity over $CSG_i$ is maximized, uses a sequential least squares programming procedure.

17. A server in communication with a router serving as an ingress of a SR path, the server comprising:
a) at least one path computation element (PCE); and
b) a non-transitory computer readable medium storing processor executable instructions which, when executed by the at least one PCE, cause the at least one PCE to determine at least one bandwidth-guaranteed segment routing (SR) path through a network from the router serving as the ingress of the SR path to an egress router, by performing a method comprising:
a) receiving, as input, a bandwidth demand value;
b) obtaining network information;
c) determining a constrained shortest multipath ($CSG_i$) from the router serving as the ingress of the SR path to the egress router;
d) determining a set of SR segment-list(s) ($S_i=[sl_1^i, sl_2^i \ldots sl_n^i]$) that are needed to steer traffic over $CSG_i$; and
e) tuning each of a plurality of loadshares in a set of segment link loadshares $L_i$ that the router serving at the ingress of the SR path uses to steer portions of the bandwidth demand to the egress router, using all of 1) $S_i$ and the per segment-list loadshare ($L_i=[l_1^i, l_2^i, \ldots l_n^i]$),
2) the per segment equal cost multipath ("ECMP"), and
3) the per link residual capacity, such that the bandwidth capacity over $CSG_i$ is maximized or such that the bandwidth capacity meets a threshold value.

\* \* \* \* \*